(12) United States Patent
Oba

(10) Patent No.: US 11,866,073 B2
(45) Date of Patent: Jan. 9, 2024

(54) INFORMATION PROCESSING DEVICE, INFORMATION PROCESSING SYSTEM, AND INFORMATION PROCESSING METHOD FOR WEARABLE INFORMATION TERMINAL FOR A DRIVER OF AN AUTOMATIC DRIVING VEHICLE

(71) Applicant: SONY SEMICONDUCTOR SOLUTIONS CORPORATION, Kanagawa (JP)

(72) Inventor: Eiji Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 176 days.

(21) Appl. No.: 17/047,033

(22) PCT Filed: Mar. 15, 2019

(86) PCT No.: PCT/JP2019/010777
§ 371 (c)(1),
(2) Date: Oct. 12, 2020

(87) PCT Pub. No.: WO2019/208014
PCT Pub. Date: Oct. 31, 2019

(65) Prior Publication Data
US 2021/0155268 A1  May 27, 2021

(30) Foreign Application Priority Data

Apr. 26, 2018 (JP) ................................ 2018-085234

(51) Int. Cl.
*B60W 60/00* (2020.01)
*B60W 40/09* (2012.01)
(Continued)

(52) U.S. Cl.
CPC ........ *B60W 60/0053* (2020.02); *B60W 40/09* (2013.01); *B60W 60/0057* (2020.02);
(Continued)

(58) Field of Classification Search
None
See application file for complete search history.

(56) References Cited

U.S. PATENT DOCUMENTS

| 5,774,069 A | 6/1998 | Tanaka et al. |
| 2011/0218765 A1* | 9/2011 | Rogers .................... G04F 10/00 368/107 |

(Continued)

FOREIGN PATENT DOCUMENTS

| CN | 108349507 A | 7/2018 |
| CN | 109476322 A | 3/2019 |

(Continued)

OTHER PUBLICATIONS

Mobile Device, Feb. 23, 2018, Wikipedia, all. (Year: 2018).*

(Continued)

*Primary Examiner* — James J Lee
*Assistant Examiner* — Tawri M McAndrews
(74) *Attorney, Agent, or Firm* — CHIP LAW GROUP

(57) ABSTRACT

Provided is a mobile device that acquires the section information of an automatic driving section and a manual driving section on a traveling route, and estimates the time to reach each section and transmits the estimated time to an information terminal. The information terminal receives the transmission data from the mobile device, and outputs the section information of the automatic driving section and the manual driving section and the display data by which a time to reach each section is confirmable. Moreover, the mobile device determines notification timing of a manual driving recovery request notification on the basis of an arousal level, (Continued)

a position, or the like of a driver and transmits the determined notification timing to the information terminal, and the information terminal executes the manual driving recovery request notification at appropriate notification timing.

21 Claims, 22 Drawing Sheets

(51) Int. Cl.
  *B60W 50/14* (2020.01)
  *G06F 1/16* (2006.01)
  *B60W 40/08* (2012.01)
(52) U.S. Cl.
  CPC ............. *G06F 1/163* (2013.01); *B60W 50/14* (2013.01); *B60W 2040/0872* (2013.01); *B60W 2050/146* (2013.01)

(56) References Cited

U.S. PATENT DOCUMENTS

| | | | | |
|---|---|---|---|---|
| 2015/0025917 | A1* | 1/2015 | Stempora | G06Q 40/08 |
| | | | | 705/4 |
| 2016/0001781 | A1* | 1/2016 | Fung | G16H 50/20 |
| | | | | 701/36 |
| 2016/0121907 | A1* | 5/2016 | Otake | B60W 10/20 |
| | | | | 701/23 |
| 2018/0088573 | A1 | 3/2018 | Watanabe et al. | |
| 2018/0329414 | A1 | 11/2018 | Igarashi et al. | |
| 2019/0056732 | A1* | 2/2019 | Aoi | B60W 50/082 |
| 2019/0072957 | A1 | 3/2019 | Fujimura et al. | |
| 2019/0126942 | A1* | 5/2019 | Goto | B60W 10/20 |
| 2019/0317506 | A1* | 10/2019 | Ishioka | B60W 50/14 |
| 2019/0370580 | A1* | 12/2019 | Aoi | G06T 7/00 |
| 2020/0231181 | A1* | 7/2020 | Miyahara | B60W 60/0051 |
| 2020/0377126 | A1* | 12/2020 | Obata | G01C 21/36 |

FOREIGN PATENT DOCUMENTS

| | | |
|---|---|---|
| DE | 19648943 A1 | 6/1997 |
| DE | 102017122474 A1 | 3/2018 |
| DE | 112017002235 T5 | 1/2019 |
| EP | 3378722 A1 | 9/2018 |
| JP | 09-161196 | 6/1997 |
| JP | 2016-031297 A | 3/2016 |
| JP | 2016-090274 A | 5/2016 |
| JP | 2016-139204 A | 8/2016 |
| JP | 2016-192028 A | 11/2016 |
| JP | 2017-131445 A | 8/2017 |
| JP | 2017-200812 A | 11/2017 |
| JP | 2017-207955 A | 11/2017 |
| JP | 2018-055469 A | 4/2018 |
| WO | 2017/085981 A1 | 5/2017 |
| WO | 2017/187759 A1 | 11/2017 |
| WO | 2017/199610 A1 | 11/2017 |
| WO | 2018/025414 A1 | 2/2018 |
| WO | 2018/070064 A1 | 4/2018 |

OTHER PUBLICATIONS

International Search Report and Written Opinion of PCT Application No. PCT/JP2019/010777, dated Jun. 4, 2019, 12 pages of ISRWO.

* cited by examiner

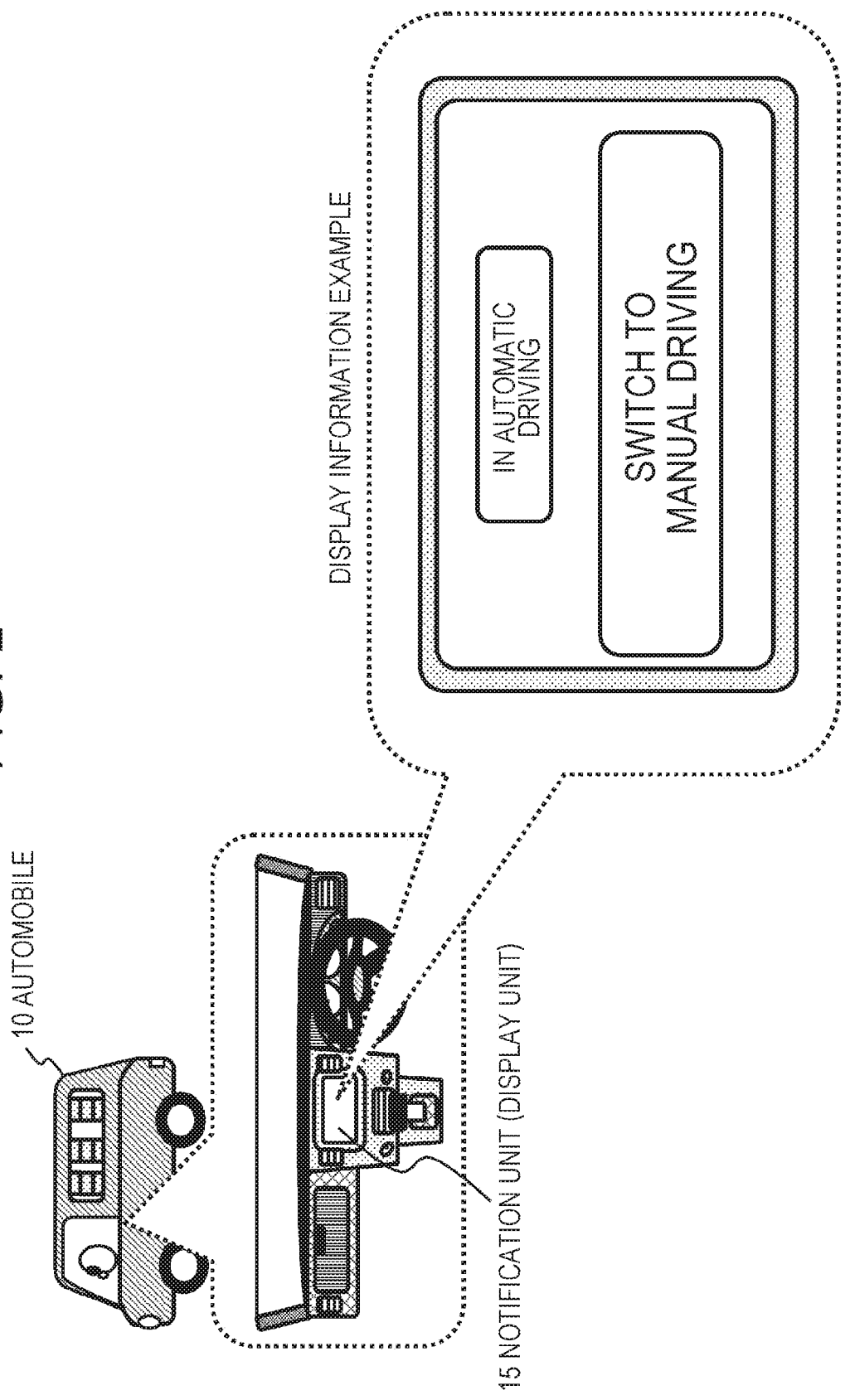

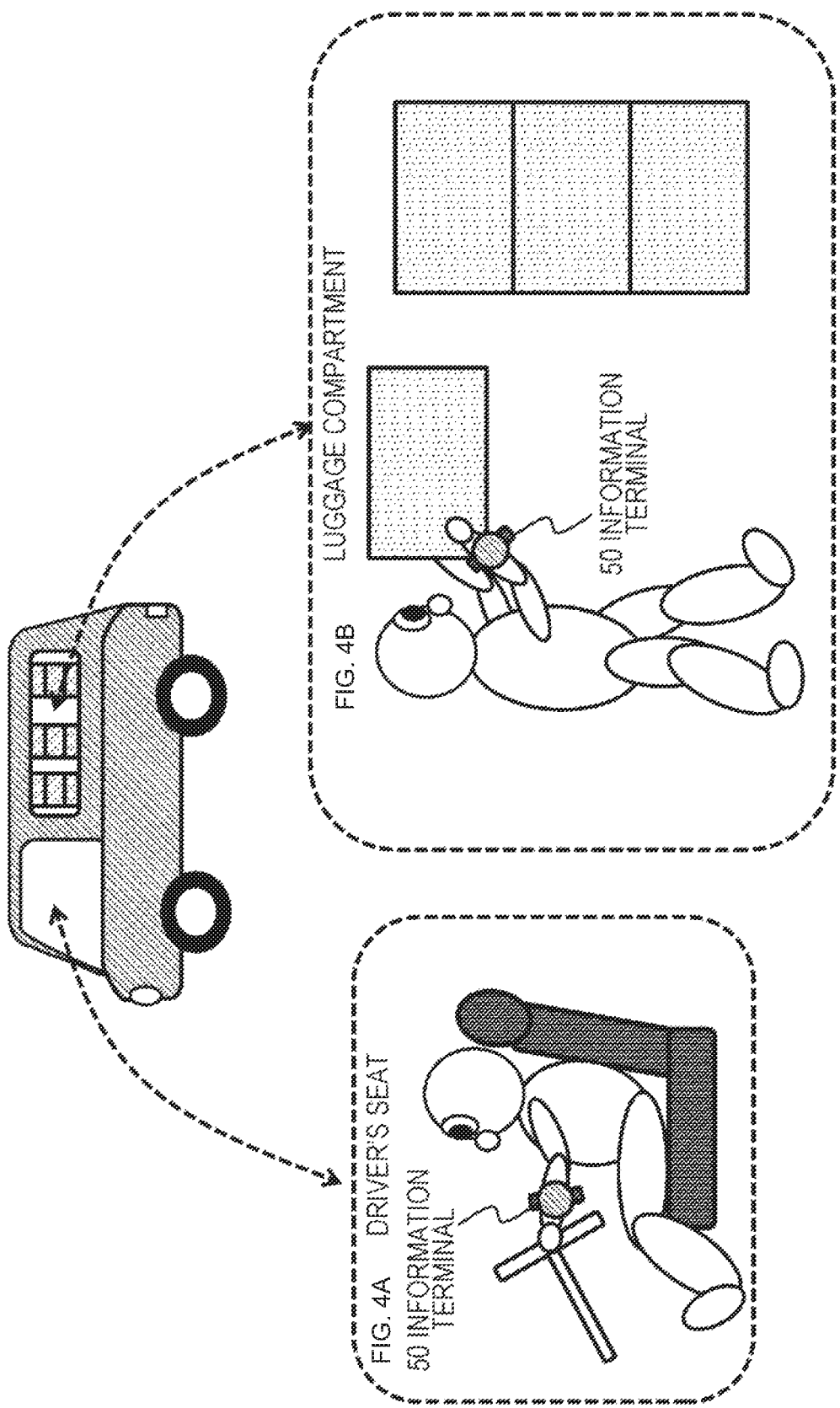

INFORMATION PROCESSING DEVICE, INFORMATION PROCESSING SYSTEM, AND INFORMATION PROCESSING METHOD FOR WEARABLE INFORMATION TERMINAL FOR A DRIVER OF AN AUTOMATIC DRIVING VEHICLE

CROSS REFERENCE TO RELATED APPLICATIONS

This application is a U.S. National Phase of International Patent Application No. PCT/JP2019/010777 filed on Mar. 15, 2019, which claims priority benefit of Japanese Patent Application No. JP 2018-085234 filed in the Japan Patent Office on Apr. 26, 2018. Each of the above-referenced applications is hereby incorporated herein by reference in its entirety.

TECHNICAL FIELD

The present disclosure relates to an information processing device, an information processing system, an information processing method, and a program. More specifically, the present disclosure relates to an information processing device, an information processing system, an information processing method, and a program for executing processing of providing information such as switching timing between automatic driving and manual driving to a driver of an automatically driving vehicle.

BACKGROUND ART

In recent years, for the purpose of improving safety of vehicle traveling, reducing a load on a driver, and the like, systems for automatically supporting and controlling traveling of a vehicle without a driver's operation are being developed. In the automatically driving vehicle, allowance of execution of a secondary task is expected in the future. However, as a road infrastructure for the time being, introduction of an environmental infrastructure as a traveling route is expected, in which a driver intervention required section where so-called manual driving is required and a automatically drivable section are mixed in spots. Therefore, to favorably execute the secondary task by the driver, section information such as a manual section and an automatic section on the traveling route needs to be appropriately provided to the driver, and the latest information for each proceeding section during traveling needs to correspond to situation change that varies moment to moment. Then, end points of these automatic driving sections are not always fixed.

For example, Patent Document 1 (Japanese Patent Application Laid-Open No. 2016-139204) discloses a technology of displaying danger levels for a plurality of dangers on a road on which a driver's own vehicle is planned to travel. Furthermore, for example, Patent Document 2 (Japanese Patent Application Laid-Open No. 2016-090274) discloses a technology of displaying and notifying the driver who is focusing on a mobile terminal that the driver is in a situation to start manual driving on a screen of the mobile terminal in the case of causing the driver to start manual driving during automatic driving.

CITATION LIST

Patent Document

Patent Document 1: Japanese Patent Application Laid-Open No. 2016-139204

Patent Document 2: Japanese Patent Application Laid-Open No. 2016-090274

SUMMARY OF THE INVENTION

Problems to be Solved by the Invention

Currently, the momentum to use automatic driving of vehicles in a real world space is increasing due to the maturation of vehicle surrounding environment recognition technologies, the development of map information of road driving environments, and the like for performing automatic driving. However, in reality, it is difficult to realize an environment equivalent to an environment with a closed track, such as a subway, at a practical cost in every continuous section where vehicles can travel. Therefore, in reality, a traveling section where an automatic driving permissible section that is a road of a driving level where all automatic driving is available, and a manual driving section that is a road where no automatic driving is allowed are randomly connected is assumed. In this way, configuration of a road environment in which different sections from a section where the automatic driving is available to the manual driving section under driver's observation or which requires manual driving intervention are mixed is expected. Then in the case of traveling in such a mixed road section, the vehicle cannot maintain smooth traveling on a route crossing sections if recovery to the manual driving required for the driver when crossing the sections is not properly performed.

Therefore, for example, a proposal of using a closed environment where full automatic driving is available, and a proposal of urgently stopping the vehicle in the case where appropriate takeover from the automatic driving to the manual driving cannot be performed have been made. However, if an emergency stop vehicle overflows on the road, it may cause a traffic jam, and an increase in the number of emergency stop vehicles may cause accidents that have not happened before. Such a situation impedes normal social activities and is a problem to be solved for the spread of automatic driving.

For example, to widely disseminate the level 3 automatic driving, which is currently widely discussed, to general roads and dedicated roads, an environment for enabling level 3 automatic driving vehicles to smoothly travel in an automatic driving section needs to be constructed and maintained. Moreover, the driver needs to instantly start normal manual driving at an end point of the automatic driving section, that is, at an entry point to a manual driving start section.

To enable the driver to instantly start the normal manual driving at the entry point to the manual driving start section, the driver is required to always monitor the section and to be in a tense state even in the automatic driving section. Imposing such a load on the driver is not favorable in light of ergonomic and psychological aspects. Furthermore, in reality, impaired attention such as the driver falling asleep during the automatic driving is well predictable. Furthermore, in a parcel-delivery vehicle or the like, there are some cases where the driver leaves the driver's seat during the automatic driving and sorts parcels in a luggage compartment, for example. It is assumed that the driver may forget about approach of a manual driving section during the execution of such work.

The present disclosure has been made in view of such a realistic situation, and an object of the present disclosure is to provide an information processing device, an information processing system, an information processing method, and a program that provide information such as approach of a manual driving start section and the like with a driver of an automatically driving vehicle, and enable the driver to smoothly start the manual driving at an entry to the manual driving start section.

Solutions to Problems

The first aspect of the present disclosure resides in
an information processing device that is a wearable terminal wearable on a human body, the information processing device including:
a display unit configured to output section information of an automatic driving section and a manual driving section on a traveling route of a mobile device, and display data by which a time to reach each section is confirmable.

Moreover, the second aspect of the present disclosure resides in
an information processing system including a mobile device and an information terminal having a wearable specification wearable on a driver of the mobile device, in which
the mobile device
executes processing of acquiring section information of an automatic driving section and a manual driving section on a traveling route of the mobile device, estimating a time to reach each section, and transmitting the estimated time to the information terminal, and
the information terminal
receives transmission data from the mobile device, and
outputs the section information of an automatic driving section and a manual driving section on a traveling route of the mobile device, and display data by which the time to reach each section is confirmable, to a display unit.

Moreover, the third aspect of the present disclosure resides in
an information processing method executed in an information processing device,
the information processing device being a wearable terminal wearable on a human body, the information processing method including:
by a data processing unit, outputting section information of an automatic driving section and a manual driving section on a traveling route of a mobile device, and display data by which a time to reach each section is confirmable, to a display unit.

Moreover, the fourth aspect of the present disclosure resides in
an information processing method executed in an information processing system including a mobile device and an information terminal having a wearable specification wearable on a driver of the mobile device, the information processing method including:
by the mobile device,
executing processing of acquiring section information of an automatic driving section and a manual driving section on a traveling route of the mobile device, estimating a time to reach each section, and transmitting the estimated time to the information terminal; and
by the information terminal,
receiving transmission data from the mobile device; and
outputting the section information of an automatic driving section and a manual driving section on a traveling route of the mobile device, and display data by which the time to reach each section is confirmable, to a display unit.

Moreover, the fifth aspect of the present disclosure resides in
a program for causing an information processing device to execute information processing,
the information processing device being a wearable terminal wearable on a human body,
the program for causing a data processing unit to output section information of an automatic driving section and a manual driving section on a traveling route of a mobile device, and display data by which a time to reach each section is confirmable, to a display unit.

Note that the program according to the present disclosure is, for example, a program that can be provided by a storage medium or a communication medium provided in a computer readable format to an information processing device or a computer system that can execute various program codes. By providing such a program in the computer readable format, processing according to the program is implemented on the information processing device or the computer system.

Still other objects, features, and advantages of the present disclosure will become clear from more detailed description based on examples and attached drawings of the present disclosure to be described below. Note that a system in the present specification is a logical aggregate configuration of a plurality of devices, and is not limited to devices having respective configurations within the same housing.

Effect of the Invention

According to a configuration of an embodiment of the present disclosure, a configuration to output section information of an automatic driving section and a manual driving section and display data by which a time to reach each section is confirmable to a wearable terminal is implemented.

Specifically, for example, a mobile device acquires the section information of the automatic driving section and the manual driving section on a traveling route, and estimates the time to reach each section and transmits the estimated time to an information terminal. The information terminal receives the transmission data from the mobile device, and outputs the section information of the automatic driving section and the manual driving section and the display data by which a time to reach each section is confirmable. Moreover, the mobile device determines notification timing of a manual driving recovery request notification on the basis of an arousal level, a position of a driver, or the like, and transmits the determined notification timing to the information terminal, and the information terminal executes the manual driving recovery request notification at the notification timing.

With the present configuration, the configuration to output section information of an automatic driving section and a manual driving section and display data by which a time to reach each section is confirmable to a wearable terminal is implemented.

Note that the effects described in the present specification are merely examples and are not limited, and additional effects may be exhibited.

BRIEF DESCRIPTION OF DRAWINGS

FIG. 2 is a diagram for describing an example of data displayed on a display unit of the mobile device of the present disclosure.

FIGS. 4A and 4B are diagrams for describing a use configuration example of an information terminal of the present disclosure.

MODE FOR CARRYING OUT THE INVENTION

Figure 1:
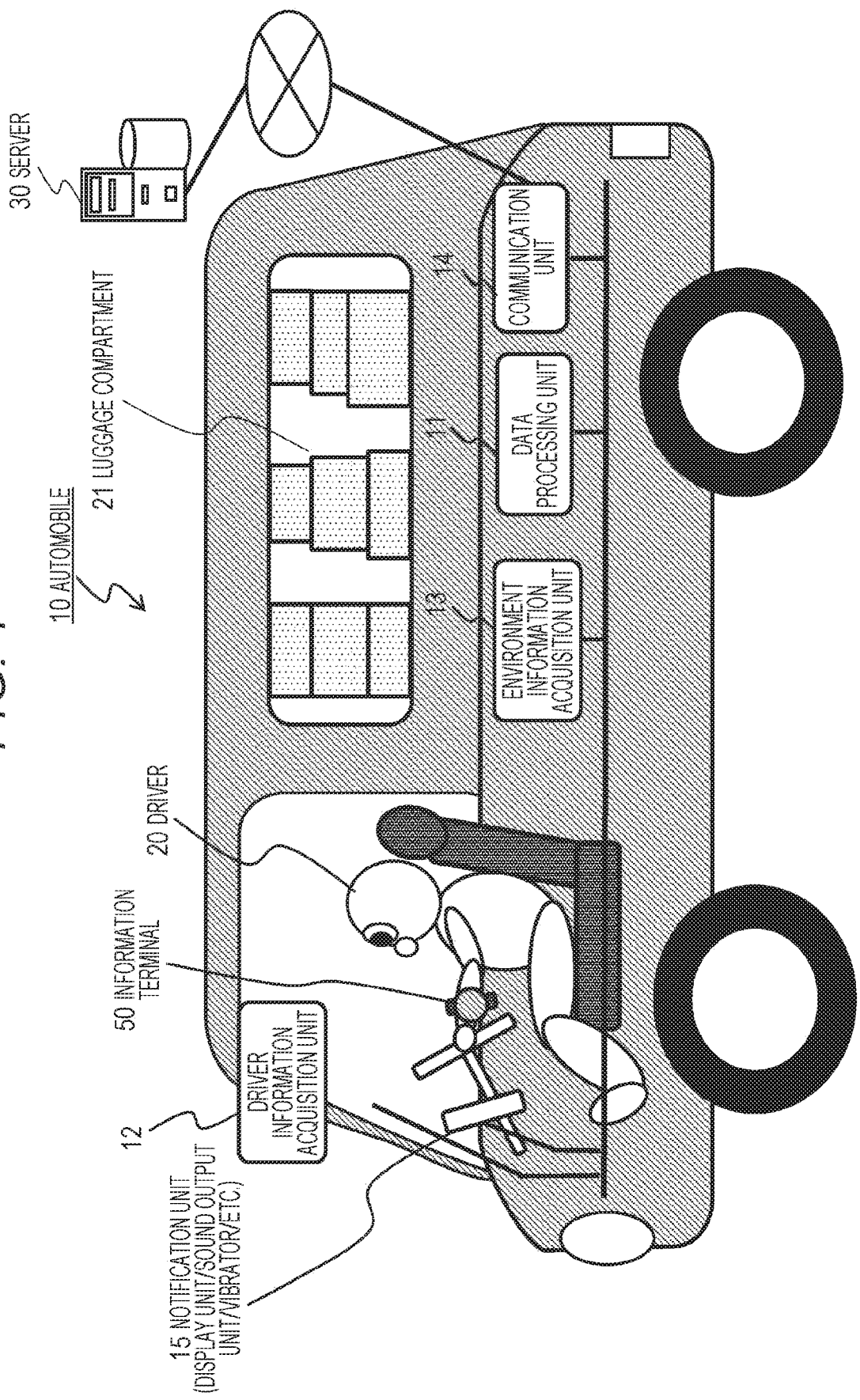
FIG. 1 is a diagram for describing a configuration example of a mobile device of the present disclosure.

Hereinafter, an information processing device, an information processing system, and an information processing method, and a program of the present disclosure will be described in detail with reference to the drawings. Note that the description will be given according to the following items.

1. Outline of Configurations and Processing of Mobile Device and Information Processing Device (Information Terminal)
2. Specific Configuration and Processing Example of Mobile Device
3. Mode Switching Sequence from Automatic Driving Mode to Manual Driving Mode
4. Operation Sequence Example of Automatic Driving
5. Sequence of Processing Executed by Mobile Device and Information Processing Device (Information Terminal) of Present Disclosure
6. Configuration Example of Information Processing Device
7. Conclusion of Configurations of Present Disclosure

[1. Outline of Configurations and Processing of Mobile Device and Information Processing Device (Information Terminal)]

An outline of configurations and processing of a mobile device and an information processing device (information terminal) will be described with reference to FIG. 1 and the subsequent drawings.

The mobile device is an automobile capable of traveling while switching the automatic driving and the manual driving, for example. In such an automobile, in a case where necessity to switch the automatic driving mode to the manual driving mode occurs, it is necessary to cause a driver to start the manual driving.

However, there are various types of processing (secondary tasks) performed by the driver during execution of the automatic driving. For example, there are a case where the driver is looking at the front of the vehicle while the driver is merely releasing a steering wheel, similarly to the case of driving, a case where the driver is reading a book, and a case where the driver falls asleep. The arousal level (consciousness level) of the driver varies depending on the difference in these types of processing.

For example, falling asleep reduces the driver's arousal level. That is, the consciousness level is lowered. In such a state where the arousal level is lowered, normal manual driving cannot be performed, and if the mode is switched to the manual driving mode in the state, an accident may occur in the worst case.

To secure the safety of driving, it is necessary to cause the driver to start the manual driving in a state where the driver's arousal level is high, that is, in a state where the driver is clearly conscious. Therefore, it is necessary to change the notification timing for requesting switching from the automatic driving to the manual driving according to the arousal level of the driver who is executing the automatic driving.

For example, in a case where the driver looks forward and is looking at the road while executing the automatic driving, the driver's arousal level is high, that is, the driver can start the manual driving at any time. In such a case, notification for switching to the manual driving is simply issued immediately before the time when the manual driving is required. This is because the driver can immediately start safe manual driving.

However, in a case where the driver falls asleep during execution of the automatic driving, the driver's arousal level is extremely low. In such a case, if notification for switching to the manual driving is issued at timing immediately before the time when the manual driving is required, the driver is forced to start the manual driving in the state where consciousness is unclear. As a result, the possibility of causing an accident increases. Therefore, in the case where the arousal level is low, as described above, it is necessary to issue notification of the switching to the manual driving at an earlier stage.

Furthermore, an automobile 10 illustrated in FIG. 1 is a wagon vehicle for parcel delivery, and a driver 20 sometimes leaves a driver's seat during the automatic driving and moves to a luggage compartment 21 and sorts the parcels for deliver, for example. As described above, in the case where the driver 20 is away from the driver's seat, it is necessary to control manual driving switching notification timing in consideration of time to return to the driver's seat.

As described above, at present, the infrastructure for enabling the automatic driving in all of traveling sections has not been realized, and there are sections where the manual driving is required. Therefore, the driver is required to recover from the automatic driving to the manual driving at various timings and points. The configuration of the present disclosure provides approach information of a manual driving start section and the like to the driver in an automatic driving vehicle, and enables the driver to smoothly start the manual driving at the time of entering the manual driving start section.

An outline of configurations and processing of a mobile device and an information processing device (information terminal 50 illustrated in FIG. 1) will be described with reference to FIG. 1 and the subsequent drawings.

FIG. 1 illustrates a configuration example of the automobile 10 that is an example of the mobile device.

Furthermore, the information terminal 50 of the present disclosure is attached to an arm of the driver 20 in the automobile 10 illustrated in FIG. 1.

The information terminal 50 is a wearable terminal wearable on a human body. Here, as an example of the wearable terminal, a wristwatch-type terminal is illustrated. An information processing device of the present disclosure is not limited to such a wristwatch-type terminal, and may be a wearable terminal attachable to various portions of a person, such as a terminal worn on the head, a terminal worn on a waist, or a ring-type terminal, for example.

The automobile 10 illustrated in FIG. 1 is an automobile capable of driving in two driving modes of the manual driving mode and the automatic driving mode.

In the manual driving mode, traveling based on an operation of a driver 20, that is, an operation of a steering wheel (steering), an operation of an accelerator, a brake, or the like is performed.

Meanwhile, in the automatic driving mode, the operation by the driver 20 is unnecessary, and driving based on sensor information such as a position sensor and other ambient information detection sensors is performed.

The position sensor is, for example, a GPS receiver or the like, and the ambient information detection sensor is, for example, a camera, an ultrasonic sensor, a radar, a light detection and ranging or a laser imaging detection and ranging (LiDAR), a sonar, or the like.

Note that FIG. 1 is a diagram for describing an outline of the present disclosure and schematically illustrates main configuration elements. Detailed configurations will be described below.

As illustrated in FIG. 1, the automobile 10 includes a data processing unit 11, a driver information acquisition unit 12, an environment information acquisition unit 13, a communication unit 14, and a notification unit 15.

The driver information acquisition unit 12 acquires, for example, information for determining the arousal level of the driver, such as biometric information of the driver, and operation information of the driver. Specifically, for example, the driver information acquisition unit 12 includes a camera that captures a face image of the driver, a sensor that acquires motions of eyeballs and pupils or the like, a measurement sensor for temperature or the like, and an operation information acquisition unit for the operation units (steering wheel, accelerator, brake, and the like), and the like.

The environment information acquisition unit 13 acquires traveling environment information of the automobile 10. For example, image information of the front, rear, right, and left of the automobile, and surrounding obstacle information from the light detection and ranging or the laser imaging detection and ranging (LiDAR), the sonar, or the like.

The data processing unit 11 receives the driver information acquired by the driver information acquisition unit 12 and the environment information acquired by the environment information acquisition unit 13 as inputs, and calculates safety index values indicating whether or not the driver in the automatic driving vehicle is in a safe manual driving executable state, and moreover, whether or not the driver in the manual driving is executing safe driving, for example.

Moreover, for example, in the case where necessity of switching from the automatic driving mode to the manual driving mode arises, the data processing unit 11 executes processing of issuing notification for switching to the manual driving mode via the notification unit 15.

This notification processing timing is optimum timing calculated using the inputs from the driver information acquisition unit 12 and the environment information acquisition unit 13, for example.

That is, it is the timing when the driver 20 can start safe manual driving.

Specifically, in the case where the arousal level of the driver is high, the notification is issued immediately before the manual driving start time, for example, five seconds before. In the case where the arousal level of the driver is low, the notification is issued twenty seconds before the manual driving start time with a margin, for example. Specific calculation of the optimum timing for the notification will be described below.

The notification unit 15 includes a display unit that displays the notification, a sound output unit, a steering wheel, or a vibrator of a seat. An example of warning display displayed on the display unit constituting the notification unit 15 is illustrated in FIG. 2.

As illustrated in FIG. 2, the notification unit (display unit) 15 displays the following items.
    Driving mode information="In automatic driving",
    Warning display="Please switch driving to manual driving"

"In automatic driving" is displayed at the time of executing the automatic driving mode, and "In manual driving" is displayed at the time of executing the manual driving mode, in a display area of the driving mode information.

The display area of the warning display information is a display area where the following item is displayed while the automatic driving is executed in the automatic driving mode.

"Please switch driving to manual driving"

Note that the automobile 10 has a configuration capable of communicating with a server 30 via the communication unit 14, as illustrated in FIG. 1.

For example, part of processing of calculating appropriate time of a notification output in the data processing unit 11 can be performed by the server 30.

A specific example of the processing will be described below.

Figure 3A:
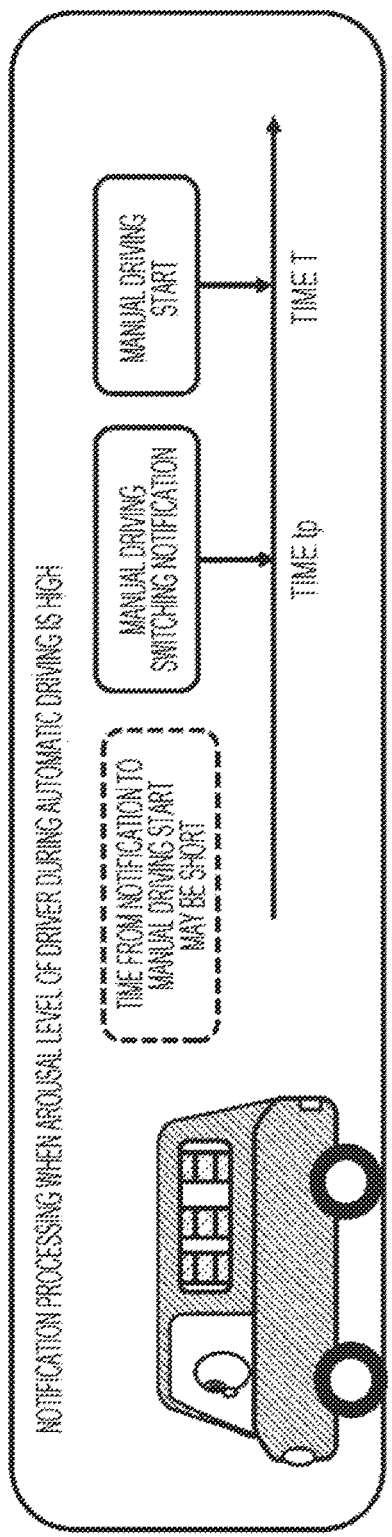
FIGS. 3A, 3B, and 3C are diagrams illustrating processing executed by the mobile device of the present disclosure.
Figure 3B:
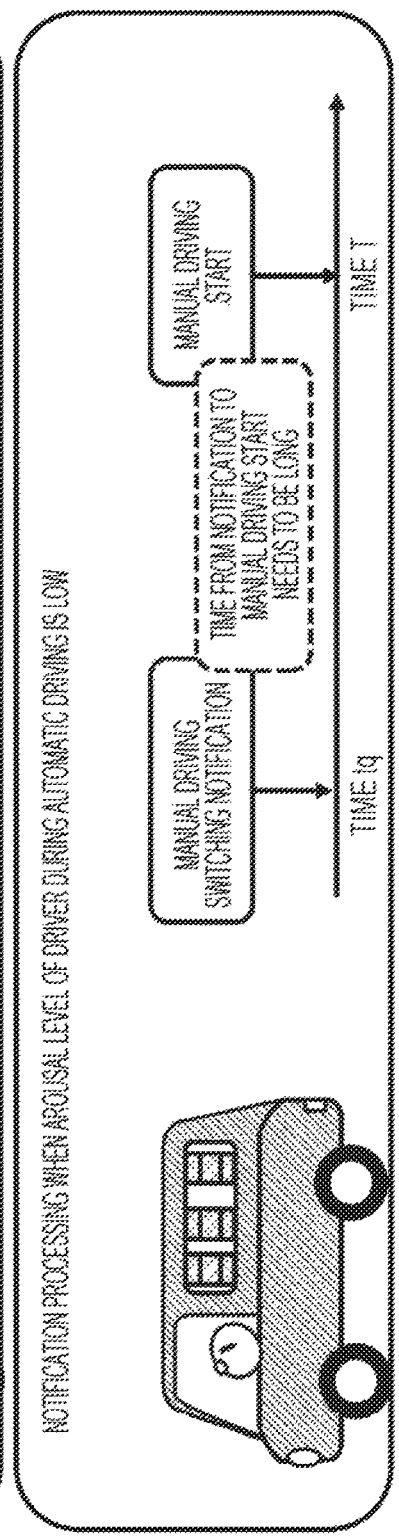
Figure 3C:
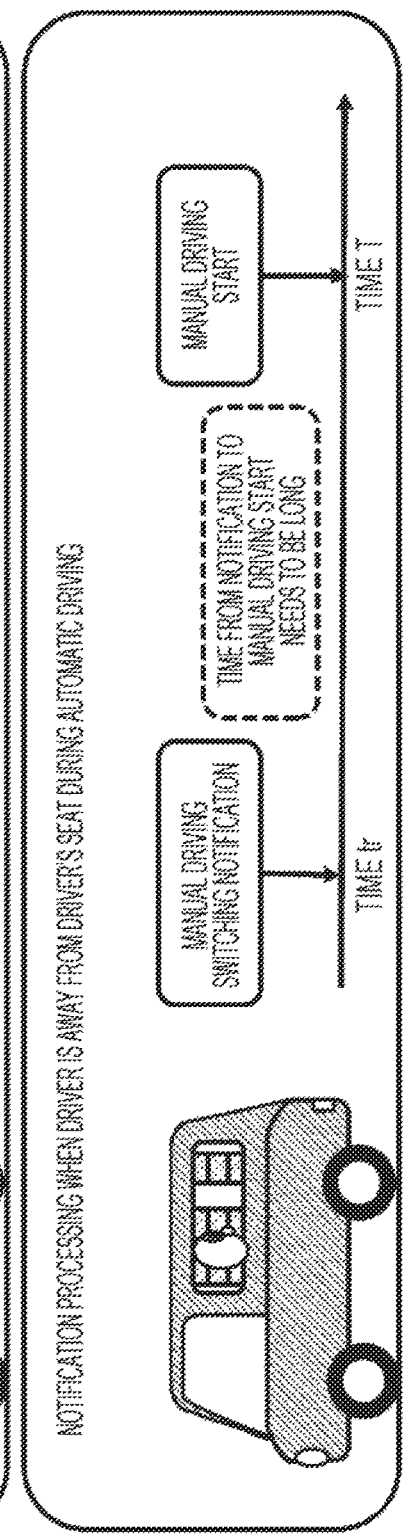

FIGS. 3A, 3B, and 3C are diagrams illustrating a specific example of processing executed by the mobile device and the information processing device of the present disclosure.

FIGS. 3A, 3B, and 3C are diagrams illustrating a setting example of appropriate timing of the notification for requesting switching to the manual driving while the automatic driving is executed in the automatic driving mode, and illustrate the following two notification processing examples.

FIG. 3A Notification processing in the case where the driver's arousal level during the automatic driving is high FIG. 3B Notification processing in the case where the driver's arousal level during the automatic driving is low FIG. 3C Notification processing in the case where the driver who is executing the automatic driving is away from the driver's seat The example FIG. 3A is an example in which the driver is looking at the road in front while executing the automatic driving. In this case, the driver's arousal level is high, that is, the user can start the manual driving at any time.

In such a case, even if the notification for switching to the manual driving is issued at timing immediately before the time when the manual driving is required, the driver can start safe manual driving soon.

The example FIG. 3B is an example in which the driver falls asleep while executing the automatic driving, and in this case, the driver's arousal level is extremely low.

In such a case, if the notification for switching to the manual driving is issued at timing immediately before the time when the manual driving is required, the driver starts the manual driving in the state where consciousness is unclear, and there is a high possibility of causing an accident. Therefore, in the case where the arousal level is low, as described above, it is necessary to issue the notification of the switching to the manual driving at an earlier stage.

The example in FIG. 3C is an example in which the driver is away from the driver's seat and working during the automatic driving. In such a case, it takes time for the driver to return to the driver's seat.

In such a case, if notification for switching to the manual driving is issued at timing immediately before the time when the manual driving is required, there is a possibility that the vehicle approaches the manual driving section before the driver returns the driver's seat. Therefore, in the case where the driver is away from the driver's seat, it is necessary to issue notification of the switching to the manual driving at an earlier stage.

Furthermore, in the case where the driver 20 in the automobile 10 illustrated in FIG. 1 is away from the driver's seat, the driver 20 cannot notice display as described with referred to FIG. 2 on a notification unit (display unit) 15 at the driver's seat.

To solve the problem, information or notification is provided via the information terminal 50 worn on an arm of the driver 20. The information terminal 50 performs display processing for the display data described with reference to FIG. 2, and further displays approach information of the section (automatic driving section or manual driving section) on the road on which the automobile 10 is traveling, and the like. Moreover, the information terminal 50 has an alarm output, a voice output, and a vibration function, and provides the driver 20 with various notifications and alarms.

FIGS. 4A and 4B are diagrams illustrating a use example of the information terminal 50. There are some cases where the driver 20 in the automobile 10 sits in the driver's seat as illustrated in FIG. 4A or leave the driver's seat and work in the luggage compartment, as illustrated in FIG. 4B, while the automobile 10 is executing the automatic driving. However, the driver 20 always wears the information terminal 50 on his/her arm and can notice the display information displayed on the information terminal 50, an output sound, an alarm, a vibration, and the like.

Figure 5:
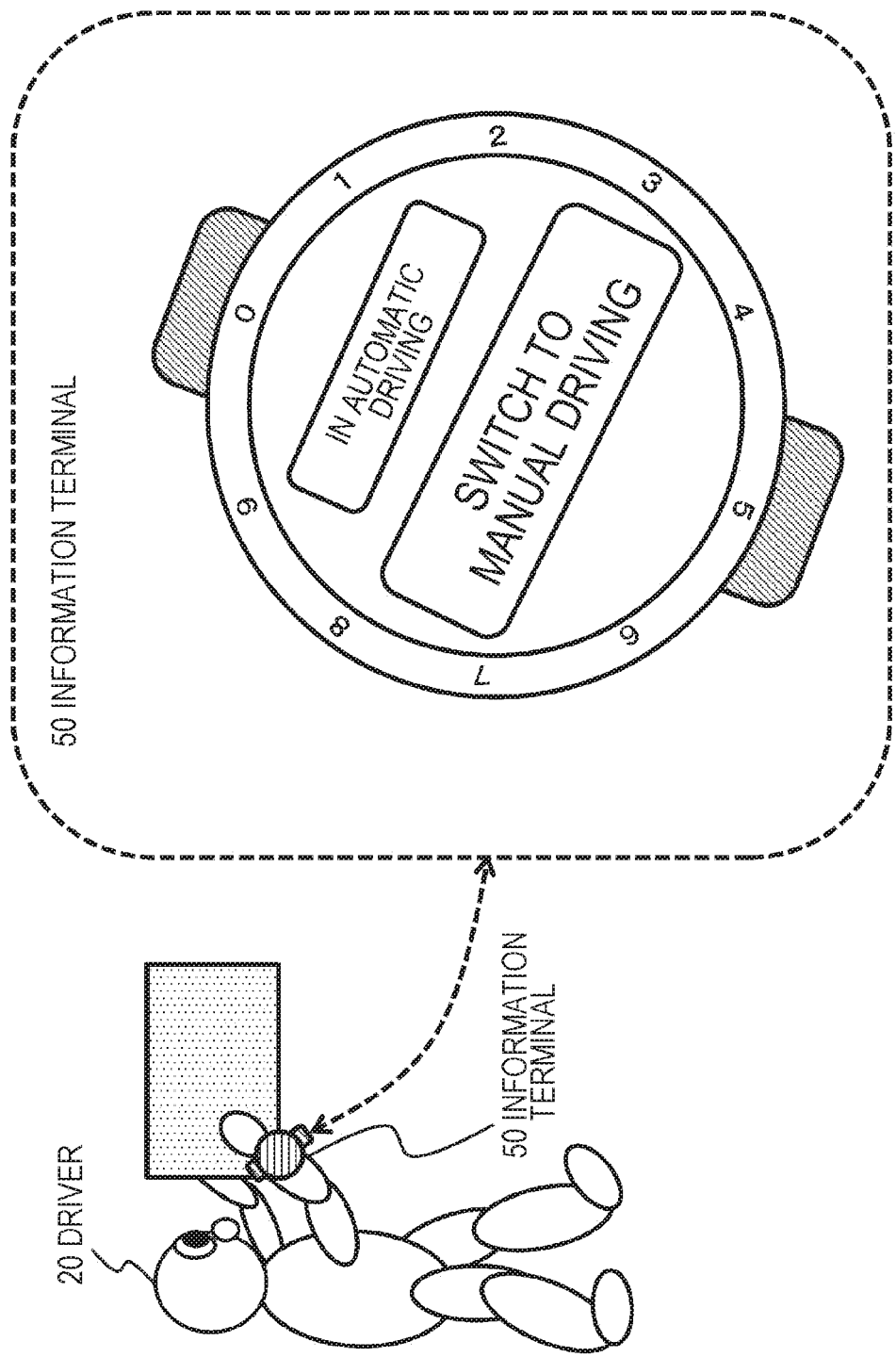
FIG. 5 is a diagram for describing a use configuration example of the information terminal of the present disclosure.

FIG. 5 is a diagram illustrating an example of the display information on the information terminal 50. The example in FIG. 5 illustrates a display example similar to the display example of the notification unit (display unit) 15 described above with reference to FIG. 2. The following displays are made on the information terminal 50.

Driving mode information="In automatic driving",

Warning display="Please switch driving to manual driving"

The driver 20 can check this display anywhere.

Figure 6:
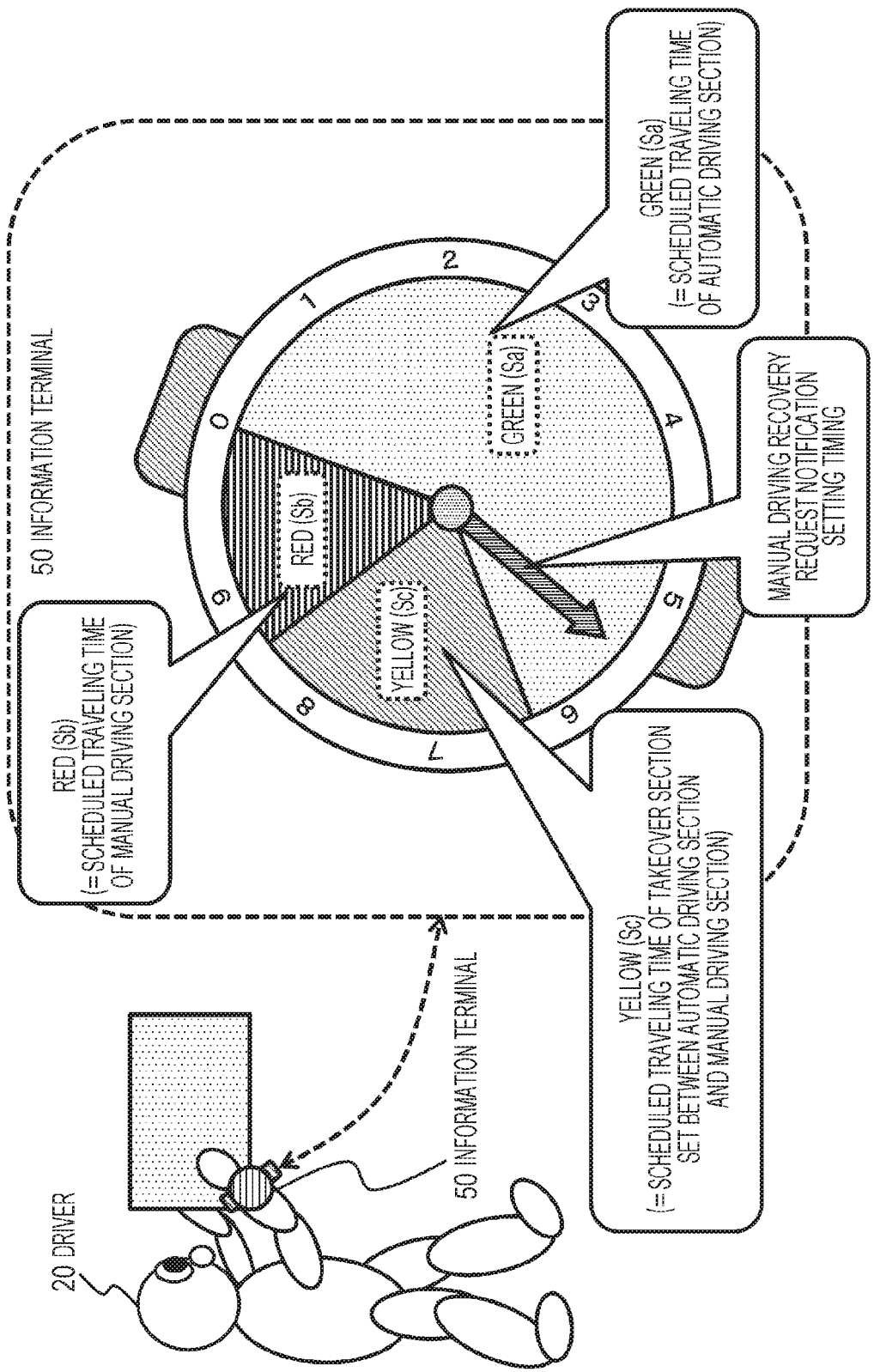
FIG. 6 is a diagram for describing a use configuration example of the information terminal of the present disclosure.

Moreover, FIG. 6 illustrates another example of the display information on the information terminal 50. The example illustrated in FIG. 6 is an example of displaying information of sections such as the automatic driving section and the manual driving section on the road according to a traveling route determined as the driver sets a destination. The numerical values 0 to 9 around the display unit indicate elapsed time of 0 to 9 minutes from the current time. The entire display area shows the section information of the scheduled traveling of the automobile from the current time (0) to 10 minutes later.

The driving route is provided with an automatic driving section Sa and a manual driving section Sb, and further, a takeover section Sc from the automatic driving to the manual driving, a cautioned traveling section Sd set in the automatic driving section Sa, and the like. Note that specific examples of these section settings will be described below.

In the display example illustrated in FIG. 6, the following three different display areas are set on the display unit of the information terminal 50.

(Sa) Automatic driving section Sa (=green display)
(Sc) Takeover driving section Sc (=yellow display)
(Sb) Manual driving section Sb (=red display)

The display example in FIG. 6 illustrates the traveling schedule of the automobile for 10 minutes from a present time. That is, the automobile is scheduled to travel in (Sa) automatic driving section Sa (=green display) after from 0 to 6 minutes and 10 seconds from the present time, then in (Sc) takeover driving section Sc (=yellow display) after from 6 minutes and 10 seconds to 8 minutes and 40 seconds from the present time, and further, the automobile is scheduled to travel in (Sb) manual driving section Sb (=red display) after 8 minutes and 40 seconds from the present time.

Note that the information terminal 50 receives, via the communication unit, scheduled traveling time information of each section calculated by the data processing unit 11 in the automobile 10 on the basis of a traveling speed of the automobile 10 or average speed information of the vehicle on the traveling route of the automobile 10, and displays the received information.

The driver 20 can confirm a remaining time to enter the manual driving section by seeing the display information on the information terminal 50, and can finish the work in the luggage compartment 21 and return to the driver's seat in time.

Note that, in the example illustrated in FIG. 6, the driver 20 can grasp entry to the manual driving section about after 8 minutes and 40 seconds from the present time on the basis of the display on the information terminal 50, can proceeds with the work to return to the driver's seat till then.

Furthermore, an arrow is further displayed on the information terminal 50 illustrated in FIG. 6. This arrow is set to the time of notifying the driver 20 of the notification of the manual driving recovery request, for example, switching to the display illustrated in FIG. 5, or outputting an alarm or starting a vibration to warn the driver 20. This notification timing is determined on the basis of information of at least either the arousal level or the position of the driver on the mobile device (automobile 10) side, for example. The determined notification timing information is transmitted to the information terminal 50. The time display of the notification using the arrow is only an example, and it is not necessary to limit the means to the arrow as long as the time interval can be visually presented, for example, by providing a visual attention attracting function by color classification, mesh display, blinking flash, or the like. Note that processing of calculating the optimum notification timing executed by the mobile device will be described below.

The information terminal 50 executes the manual driving recovery request notification at the notification timing received from the mobile device. That is, the information terminal 50 executes at least one of the display processing, the alarm output, or the vibration activation described with reference to FIG. 5 at the notification timing determined by the mobile device. Note that the notification setting can be changed or stopped by the user.

Note that, in the present embodiment, the display unit of the information terminal 50 is illustrated as a circular display unit, but this is an example. The shape of the display unit is not limited to a circle, and various shapes such as an elliptical shape and a rectangular shape can be set.

Figure 7:
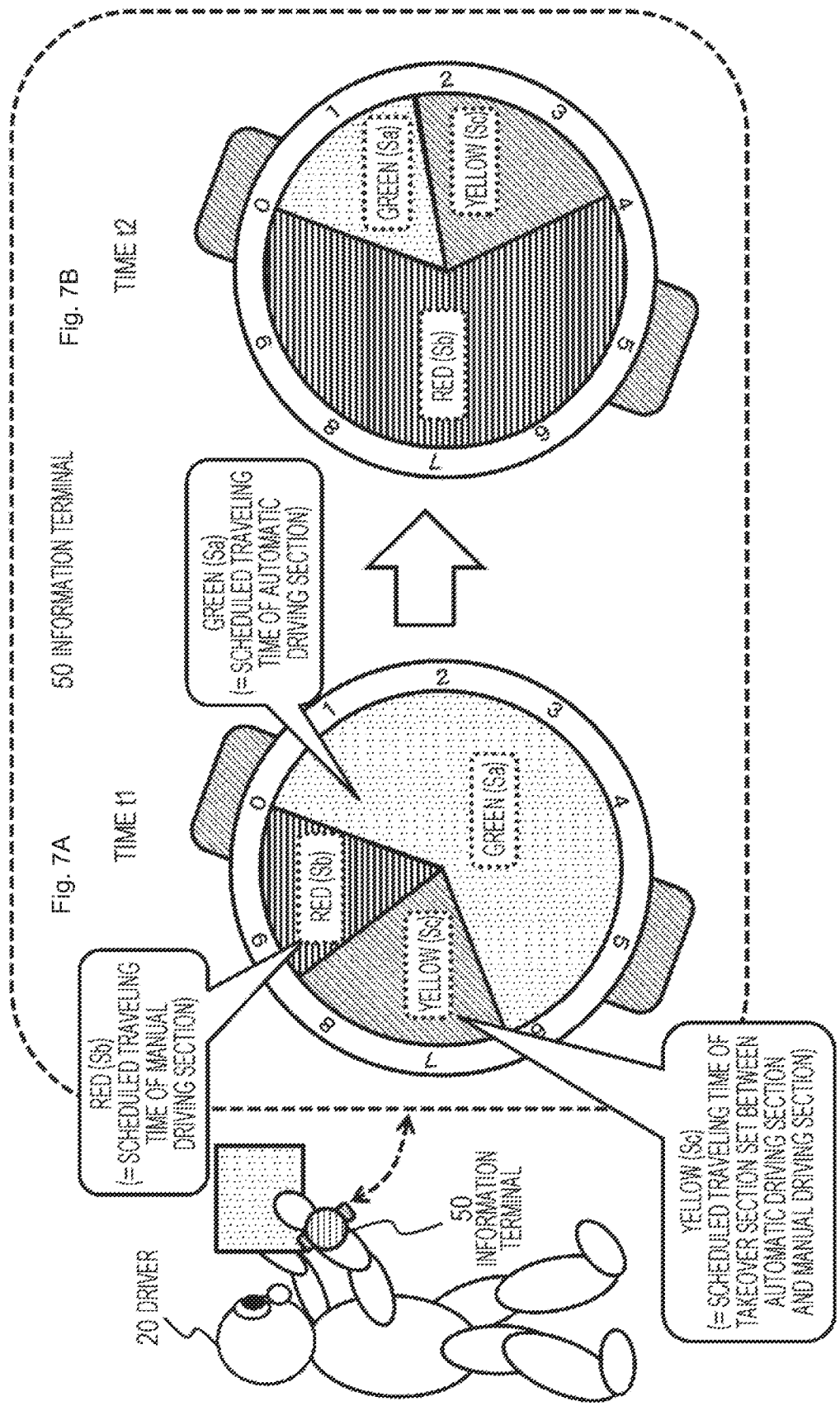
FIGS. 7A and 7B are diagrams for describing a use configuration example of the information terminal of the present disclosure.

FIGS. 7A and 7B are diagrams illustrating an example of changes in display data on the information terminal with passage of time. FIGS. 7A and 7B illustrate an example of the display information on the information terminal 50 at time t1 and the display information on the information terminal 50 at subsequent time t2.

The time t2 shows an example of the display data about 4 minutes after the time t1.

The display data at the time t2 indicates that the manual driving section Sb (=red display) is scheduled to travel after about 3 minutes and 50 seconds from the present time.

At the time t2, the driver 20 grasps that the manual driving section Sb (=red display) is approaching on the basis of the display on the information terminal 50, quickly finishes the work, and can start preparation for returning to the driver's seat.

Note that the information terminal 50 has an alarm output function and a vibration function, and for example, when the remaining time to the manual driving section Sb (=red display) reaches a predefined time (for example, 1 minute), the information terminal 50 outputs an alarm and activates vibration to warn the driver 20. Note that the activation time of the alarm and vibration can be changed or stopped according to user settings.

[2. Specific Configuration and Processing Example of Mobile Device]

Next, a specific configuration and a processing example of a mobile device corresponding to the automobile 10 of the present disclosure will be described with reference to FIG. 8 and the subsequent drawings.

Figure 8:
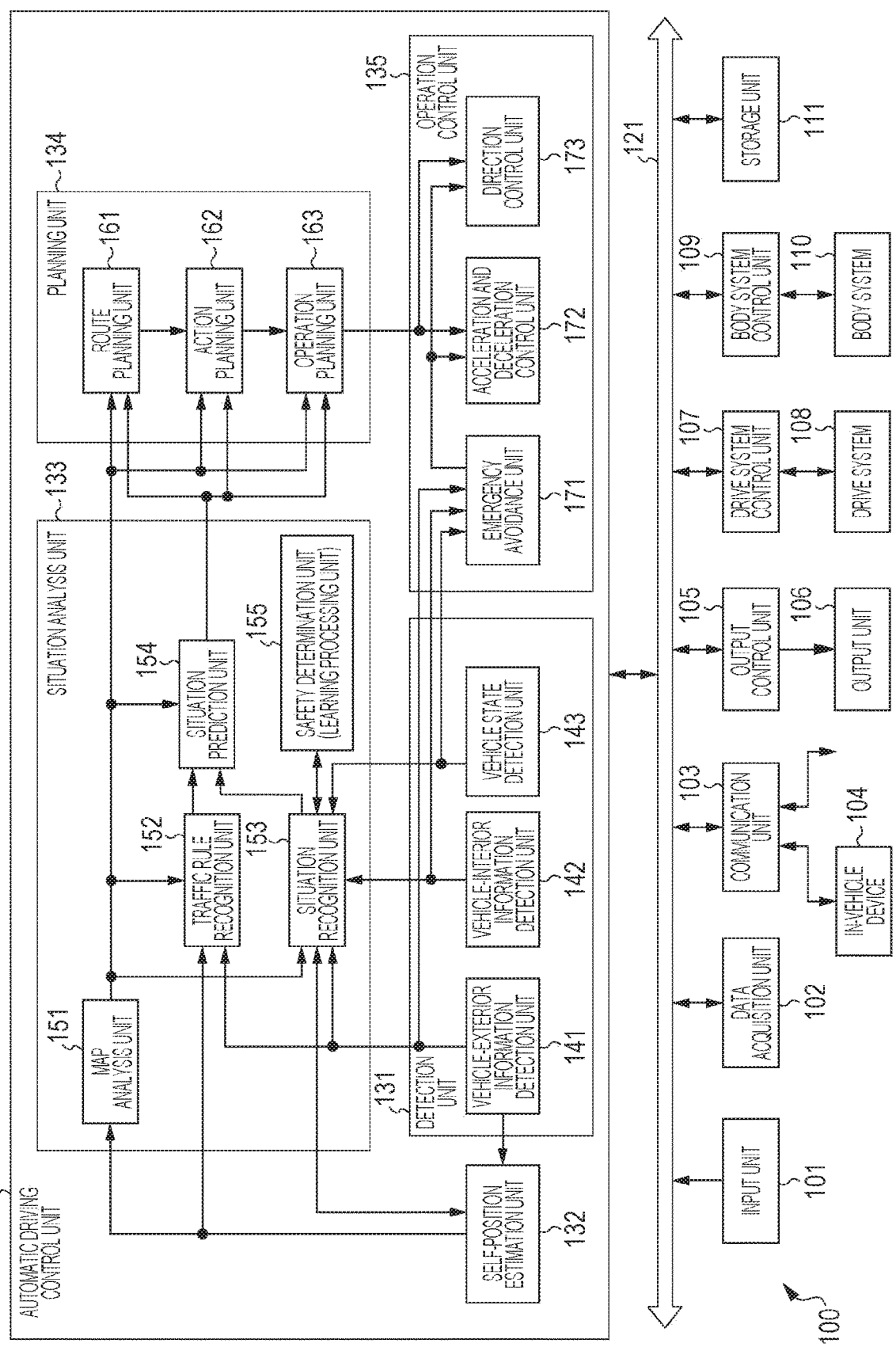
FIG. 8 is a diagram for describing a configuration example of the mobile device of the present disclosure.

FIG. 8 illustrates a configuration example of the mobile device 100. Note that, hereinafter, in a case of distinguishing a vehicle provided with the mobile device 100 from other vehicles, the vehicle is referred to as user's own car or user's own vehicle.

The mobile device 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112.

The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the mobile device 100 may be directly connected without the communication network 121.

Note that, hereinafter, the case where the units of the mobile device 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by a passenger to input various data and instructions. For example, the input unit 101 includes operation devices such as a touch panel, a button, a microphone, a switch, and a lever, and an operation device capable of inputting data and instructions by a method other than a manual operation, such as voice or gesture. Furthermore, for example, the input unit 101 may be a remote control device using infrared rays or other radio waves, or an externally connected device such as a mobile device or a wearable device corresponding to the operation of the mobile device 100. The input unit 101 generates an input signal on the basis of the data, instructions, and the like input by the passenger, and supplies the input signal to each unit of the mobile device 100.

The data acquisition unit 102 includes various sensors that acquire data to be used for the processing of the mobile device 100, and supplies the acquired data to each unit of the mobile device 100.

For example, the data acquisition unit 102 includes various sensors for detecting the state of the user's own car. Specifically, for example, the data acquisition unit 102 is a gyro sensor, an acceleration sensor, an inertial measurement device (IMU), and sensors for detecting an operation amount of an accelerator pedal, an operation amount of a brake pedal, a steering angle of a steering wheel, an engine speed, a motor speed, a rotation speed of wheels, or the like.

Furthermore, for example, the data acquisition unit 102 includes various sensors for detecting information outside the user's own car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and an ambient information detection sensor for detecting an object around the user's own car. The environment sensor includes, for example, a raindrop sensor, a fog sensor, a sunshine sensor, a snow sensor, and the like. The ambient information detection sensor includes, for example, an ultrasonic sensor, a radar device, a light detection and ranging or laser imaging detection and ranging (LiDAR) device, or a sonar.

Figure 9:
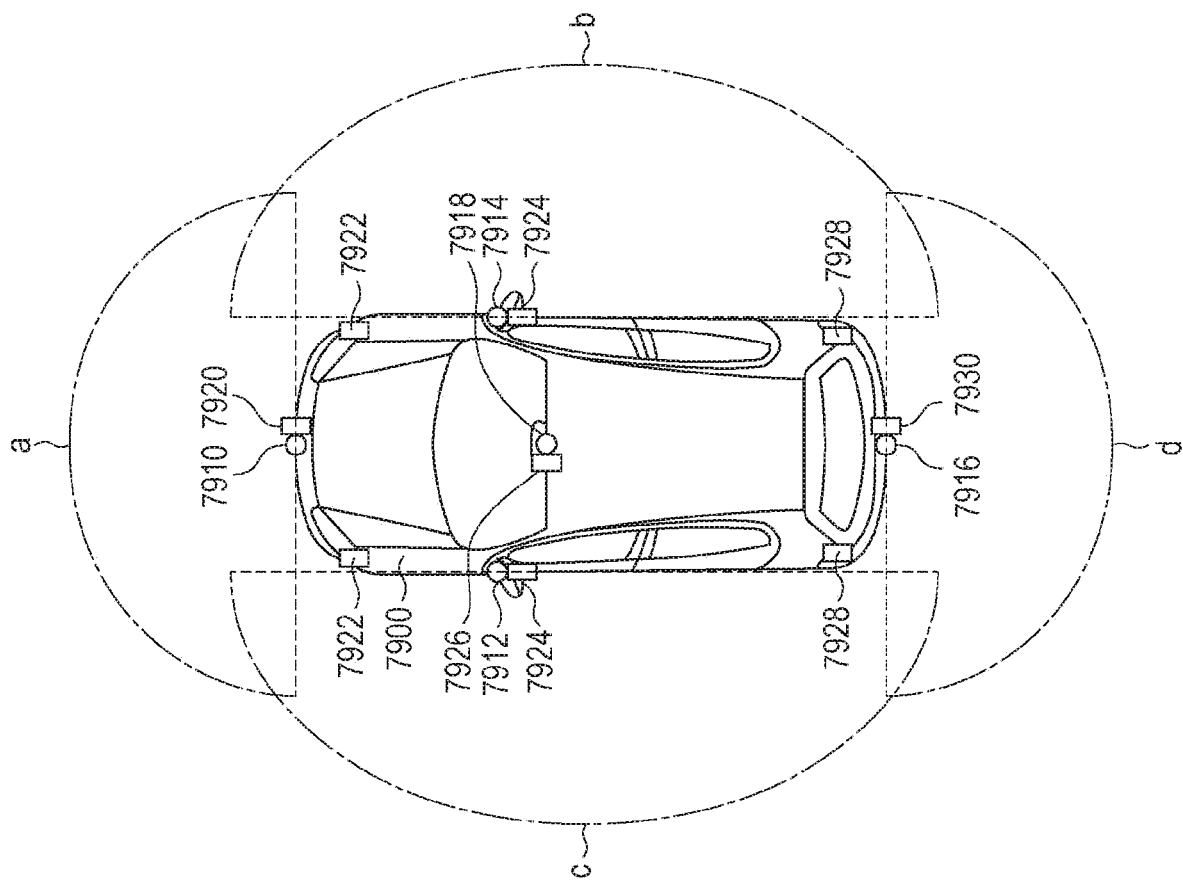
FIG. 9 is a diagram for describing a configuration example of the mobile device according to the present disclosure.

For example, FIG. 9 illustrates an installation example of the various sensors for detecting external information of the user's own car. Each of imaging devices 7910, 7912, 7914, 7916, and 7918 is provided at at least one position of a front nose, side mirrors, a rear bumper, a back door, or an upper portion of a windshield in an interior of a vehicle 7900, for example.

The imaging device 7910 provided at the front nose and the imaging device 7918 provided at an upper portion of the windshield in an interior of the vehicle mainly acquire front images of the vehicle 7900. The imaging devices 7912 and 7914 provided at the side mirrors mainly acquire side images of the vehicle 7900. The imaging device 7916 provided at the rear bumper or the back door mainly acquires a rear image of the vehicle 7900. The imaging device 7918 provided at the upper portion of the windshield in the interior of the vehicle is mainly used for detecting a preceding vehicle, a pedestrian, an obstacle, a traffic signal, a traffic sign, a lane, or the like. Furthermore, in the future automatic driving, when the vehicle turns right or left, the imaging devices may be used in an extended manner up to pedestrians crossing a road beyond the right or left-turn road in a wider range or an object range near a crossing road when the vehicle turns right or left.

Note that FIG. 9 illustrates an example of capture ranges of the imaging devices 7910, 7912, 7914, and 7916. An imaging range a indicates an imaging range of the imaging device 7910 provided at the front nose, imaging ranges b and c respectively indicate imaging ranges of the imaging devices 7912 and 7914 provided at the side mirrors, and an imaging range d indicates an imaging range of the imaging device 7916 provided at the rear bumper or the back door. For example, a bird's-eye view image of the vehicle 7900 as viewed from above, an all-round stereoscopic display image surrounding a vehicle periphery with a curved plane, and the like can be obtained by superimposing image data imaged in the imaging devices 7910, 7912, 7914, and 7916.

Sensors 7920, 7922, 7924, 7926, 7928, and 7930 provided at the front, rear, side, corner, and upper portion of the windshield in the interior of the vehicle 7900 may be ultrasonic sensors or radars, for example. Sensors 7920, 7926, and 7930 provided at the front nose, the rear bumper, the back door, and the upper portion of the windshield in the interior of the vehicle 7900 may be an LiDAR, for example. These sensors 7920 to 7930 are mainly used for detecting a preceding vehicle, a pedestrian, an obstacle, and the like. Results of the detections may be further applied to improvement of stereoscopic object display of the bird's-eye view display and the all-round stereoscopic display.

Description of the configuration elements will be continued returning to FIG. 8. The data acquisition unit 102 includes various sensors for detecting a current position of the user's own car. Specifically, for example, the data acquisition unit 102 includes a global navigation satellite system (GNSS) receiver that receives a GNSS signal from a GNSS satellite.

Furthermore, for example, the data acquisition unit 102 includes various sensors for detecting information inside the vehicle. Specifically, for example, the data acquisition unit 102 includes an imaging device that images a driver, a biosensor that detects biometric information of the driver, a microphone that collects sound in a vehicle interior, and the like. The biosensor is provided on, for example, a seating surface, a steering wheel, or the like, and detects a sitting state of an occupant sitting on a seat or biometric information of the driver holding the steering wheel. As a vital signal, diversified observable data is available such as heart rate, pulse rate, blood flow, respiration, mind-body correlation, visual stimulation, EEG, sweating state, head posture behavior, eye, gaze, blink, saccade, microsaccade, fixation, drift, gaze, and iris pupil reaction. These activity observable information reflecting an observable driving state is aggregated as observable evaluation values estimated from observations, and recovery delay time characteristics associated with logs of the evaluation values are used as specific characteristics to a recovery delay case of the driver for calculating the recovery notification timing by a safety determination unit (learning processing unit) 155 to be described below.

Figure 10:
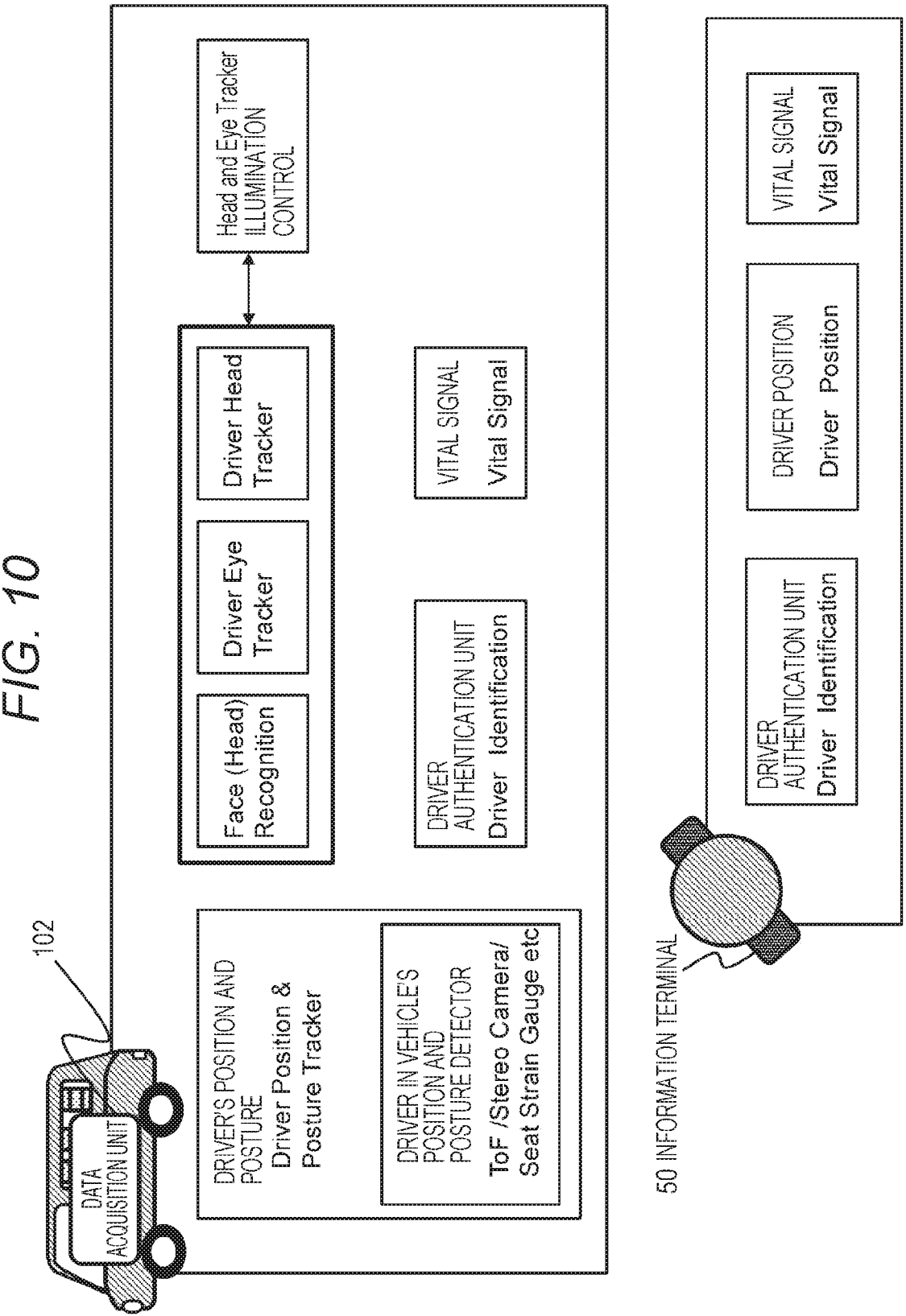
FIG. 10 is a diagram for describing a sensor configuration example of the mobile device and the information terminal of the present disclosure.

FIG. 10 illustrates an example of various sensors for obtaining information of the driver inside the vehicle included in the data acquisition unit 102. Note that the data acquisition unit 102 corresponds to the driver information acquisition unit 12 of the automobile 10 illustrated in FIG. 1.

Moreover, FIG. 10 illustrates an example of a sensor mounted in the information terminal 50.

For example, the data acquisition unit 102 includes a ToF camera, a stereo camera, a seat strain gauge, and the like as detectors for detecting the position and posture of the driver. Furthermore, the data acquisition unit 102 includes a face recognition device (face (head) recognition), a driver eye tracker, a driver head tracker, and the like, as detectors for obtaining the activity observable information of the driver.

Furthermore, the data acquisition unit 102 includes a vital signal detector as a detector for obtaining activity observable information of the driver. Furthermore, the data acquisition unit 102 includes a driver authentication (driver identification) unit. Note that, as an authentication method, biometric authentication using a face, a fingerprint, an iris of a pupil, a voiceprint, or the like can be considered in addition to knowledge authentication using a password, a personal identification number, or the like.

The information terminal 50 includes a position sensor such as a GPS sensor as a detector for detecting the position of the driver. Furthermore, the information terminal 50 includes a vital signal detector, that is, a biosensor or an activity amount measurement sensor, as a detector for obtaining activity observable information of the driver. These sensors detect the state of the driver 20 wearing the information terminal 50, for example, motion, position, activity amount, activity history, and the like of the driver 20. Furthermore, the information terminal 50 includes a driver authentication (driver identification) unit. Note that, as an authentication method, for example, biometric authentication using a face, a fingerprint, an iris of a pupil, a voiceprint, or the like is used, in addition to knowledge authentication using a password, a personal identification number, or the like.

Note that the data acquisition unit 102 can acquire a vital signal, an activity situation, and the like of the driver from the wearable terminal that is the information terminal 50. Furthermore, the driver's passive state monitoring and active response reaction can be acquired by incorporating a driver's reflective response to the notification to the information terminal 50 from the system on the automobile side, for example. Furthermore, in the case where the driver wears the information terminal 50 before getting in the vehicle, log data indicating the driver's state before getting in the vehicle acquired by the information terminal 50 is stored in the storage unit in the information terminal 50, and the log data stored in the storage unit is output to the system on the vehicle side after the driver gets in the vehicle. The system on the vehicle side can estimate an arousal state or a functional state of the driver, using the log data indicating the driver's state before boarding input from the information terminal 50.

Note that the detection information of the information terminal 50 is transmitted to the automobile 10 via the communication unit and stored in the storage unit of the automobile 10. Alternatively, the detection information is transmitted to the server 30 and stored in the storage unit of the server 30. These data are used as learning data to be applied to time estimation processing required for the driver 20 to recover to the manual driving.

The communication unit 103 communicates with the in-vehicle device 104 and various devices outside the vehicle, a server, a base station, and the like, transmits data supplied from each unit of the mobile device 100, and supplies received data to each unit of the mobile device 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI) (registered trademark), mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's own car, using a peer to peer (P2P) technology.

Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time. Note that pairing may be made with a vehicle traveling ahead while traveling in a section, which can be a leading vehicle, through the communication unit, and information acquired by a data acquisition unit mounted on the vehicle ahead may be acquired as pre-travel information and may be complementarily used as the data of the data acquisition unit 102 of the user's own car. In particular, this will be a means to secure the safety of following platooning vehicles, using platooning travel by the leading vehicle, for example.

The in-vehicle device 104 includes, for example, a mobile device (a tablet, a smartphone, or the like) or a wearable device of a passenger, an information device carried in or attached to the user's own car, and a navigation device for searching for a route to an arbitrary destination. Note that, considering that an occupant is not always fixed at a seat fixing position due to the spread of the automatic driving, the in-vehicle device 104 may be expanded to a video player, a game device, or any other devices that can be installed and removed from the vehicle in the future. In the present embodiment, an example in which presentation of information of points requiring intervention of the driver is limited to an appropriate driver has been described. However, the information may be further provided to a subsequent vehicle in platooning traveling or the like, or the information provision may be combined with remote travel support by constantly providing the information to an operation management center of passenger transportation shared buses and long-distance logistics commercial vehicles, as appropriate.

The output control unit 105 controls output of various types of information to the passenger of the user's own car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the passenger of the user's own car or to the outside of the vehicle. For example, the output unit 106 includes a display device, an instrument panel, an audio speaker, headphones, a wearable device such as a glasses-type display worn by the passenger, a projector, a lamp, or the like. The display device included in the output unit 106 may be, for example, a head-up display, a transmission-type display, or a display for displaying the visual information in a field of view of the driver, such as a device having an augmented reality (AR) display function, in addition to a device having a normal display.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's own car. For example, the drive system 108 includes a drive force generation device for generating a drive force of an internal combustion engine or a drive motor, a drive force transmission mechanism for transmitting the drive force to the wheels, a steering mechanism for adjusting the steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and notifies a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the mobile device 100. For example, the storage unit 111 stores map data such as a three-dimensional high-precision map such as a dynamic map, a global map having less accuracy than the high-precision map but covering a large area, and a local map including information around the user's own car.

The automatic driving control unit 112 performs control related to the automatic driving such as autonomous driving or driving support. Specifically, for example, the automatic driving control unit 112 performs cooperative control for the purpose of implementing an advanced driver support system (ADAS) function including collision avoidance or shock mitigation of the user's own car, following travel based on a vehicular gap, vehicle speed maintaining travel, collision warning of the user's own car, lane out warning of the user's own car, and the like. Furthermore, for example, the automatic driving control unit 112 performs the cooperative control for the purpose of automatic driving of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's own car on the basis of data or signals from each unit of the mobile device 100. For example, the vehicle exterior information detection unit 141 performs detection processing, recognition processing, and tracking processing, for an object around the user's own car, and processing of detecting a distance to the object and a relative speed. Objects to be detected include, for example, vehicles, people, obstacles, structures, roads, traffic lights, traffic signs, road markings, and the like.

Furthermore, for example, the vehicle exterior information detection unit 141 performs processing of detecting an environment around the user's own car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The information acquired by the vehicle exterior information detection unit 141 can be mainly supplied and received from an infrastructure in the case of a section stored in the local dynamic map, the section being constantly and importantly updated as a section where traveling by the automatic driving is available. Alternatively, the user's own vehicle may travel by constantly receiving information update in advance before entering a section, from a vehicle or a vehicle group traveling ahead in the section. Furthermore, in particular, for the purpose of more safely obtaining road information immediately before entering a section in a platooning travel, such as a case where the latest local dynamic map is not constantly updated by the infrastructure, road environment information obtained from a leading vehicle having entered the section may be further supplementarily used. In many cases, the section where the automatic driving is available depends on the presence or absence of prior information provided by these infrastructures. The information regarding availability of automatic driving on a route provided by an infrastructure is equivalent to providing an unseen track as so-called "information". Note that the vehicle exterior information detection unit 141 is illustrated on the assumption that the vehicle exterior information detection unit 141 is mounted on the user's own vehicle for the sake of convenience. Pre-predictability at the time of traveling may be further improved by using information captured by a preceding vehicle as "information".

The vehicle interior information detection unit 142 performs processing of detecting information inside the vehicle on the basis of data or signals from each unit of the mobile device 100. For example, the vehicle interior information detection unit 142 performs driver authentication processing and recognition processing, driver state detection processing, passenger detection processing, vehicle interior environment detection processing, and the like. The state of the driver to be detected includes, for example, physical condition, arousal level, concentration level, fatigue level, line-of-sight direction, detailed eyeball behavior, and the like.

Moreover, in the future, the driver is expected to completely taking the driver's hands off from driving and steering operation in the automatic driving, and the driver temporarily goes to sleep or starts doing another work, and the system needs to grasp how far the arousal recovery of consciousness required for driving recovery is progressing. That is, in a conventional driver monitoring system, a main detection means detects a decrease in consciousness such as drowsiness. However, in the future, the driver will be completely uninvolved in the driving and steering. Therefore, the system has no means for directly observing an intervention level of the driver from steering stability of a steering device and the like, and needs to observe a consciousness recovery transition required for driving from a state where an accurate consciousness level of the driver is unknown, grasp an accurate internal arousal state of the driver, and proceed in intervention in the manual driving of steering from the automatic driving.

Therefore, the vehicle interior information detection unit 142 mainly has two major roles. The first role is passive monitoring of the driver's state during the automatic driving. The second role is to detect the driver's periphery recognition, perception, judgment, and an operation ability of the steering device up to the level at which the manual driving is possible from when the recovery request is issued from the system to when the vehicle approaches a section of driving under caution. As control, a failure self-diagnosis of the entire vehicle may be further performed, and in a case where the function of the automatic driving is deteriorated due to partial malfunction of the automatic driving, the driver may be similarly prompted to recover to the manual driving early. The passive monitoring here refers to a type of detection means that does not require a conscious response reaction from the driver, and does not exclude devices that detect a response signal by transmitting physical radio waves, light, or the like from the device. That is, the passive monitoring refers to monitoring of the driver's unconscious state, such as during a nap, and classification that is not the driver's cognitive response is a passive system. The passive monitoring does not exclude active response devices that analyze and evaluate reflected or diffused signals obtained by emitting radio waves, infrared rays, or the like. Meanwhile, devices requesting the driver to give a conscious response requesting a response reaction are active systems.

The environment in the vehicle to be detected includes, for example, temperature, humidity, brightness, odor, and the like. The vehicle interior information detection unit 142 supplies data indicating results of the detection processing to the situation recognition unit 153 of the situation analysis unit 133 and the operation control unit 135. Note that, in the case where it is revealed that the driver cannot achieve the manual driving within an appropriate deadline after the driving recovery instruction to the driver is issued from the system, and it is determined that the takeover will not be in time even if deceleration control is performed in self-operation to give a time, an instruction is given to the emergency avoidance unit 171 and the like of the system, and deceleration, evacuation, and stop procedures are started for evacuating the vehicle. That is, even in a situation where the takeover cannot be in time as an initial state, it is possible to earn time to reach a takeover limit by starting the deceleration of the vehicle early.

The vehicle state detection unit 143 performs processing of detecting the state of the user's own car on the basis of data or signals from each unit of the mobile device 100. The state of the user's own car to be detected includes, for example, speed, acceleration, steering angle, presence or absence of abnormality, content of abnormality, state of driving operation, position and tilt of a power seat, a state of door lock, states of other in-vehicle devices, and the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's own car on the basis of the data and signals from the units of the mobile device 100, such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed.

The self-position estimation map is a high-precision map using a technology such as simultaneous localization and mapping (SLAM), or the like. The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's own car and its surroundings. The situation analysis unit 133 includes the map analysis unit 151, the traffic rule recognition unit 152, the situation recognition unit 153, a situation prediction unit 154, and a safety determination unit (learning processing unit) 155.

The map analysis unit 151 performs processing of analyzing various maps stored in the storage unit 111, using the data or signals from the units of the mobile device 100, such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's own car on the basis of the data or signals from the units of the mobile device 100, such as the self-position estimation unit 132, the vehicle exterior information detection unit 141, and the map analysis unit 151. By the recognition processing, for example, the position and state of signals around the user's own car, the content of traffic regulation around the user's own car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's own car on the basis of the data or signals from the units of the mobile device 100, such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing the situation of the user's own car, the situation around the user's own car, the situation of the driver of the user's own car, and the like. Furthermore, the situation recognition unit 153 generates a local map (hereinafter referred to as situation recognition map) used for recognizing the situation around the user's own car, as needed. The situation recognition map is, for example, an occupancy grid map.

The situation of the user's own car to be recognized is, for example, the position, posture, and motion of the user's own car (for example, speed, acceleration, moving direction, and the like), and a cargo load capacity and movement of the center of gravity of the vehicle body accompanying cargo loading, a tire pressure, a braking distance movement accompanying wear of a braking pad, allowable maximum deceleration braking to prevent cargo movement caused by load braking, and a centrifugal relaxation limit speed at the time of traveling on a curve with a liquid load, which are specific to the vehicle and determining motion characteristics of the user's own car. Moreover, the recovery start timing required for control is different depending on the conditions specific to the loading cargo, the characteristics specific to the vehicle itself, the load, and the like even if the road environment such as a friction coefficient of a road surface, a road curve, or a slope is exactly the same. Therefore, such various conditions need to be collected and learned, and reflected in the optimal timing for performing control. Simply observing and monitoring the presence or absence and content of abnormality of the user's own vehicle, for example, is not sufficient in determining the control timing according to the type of the vehicle and the load. To secure a certain level of safety in the transportation industry, or the like, according to unique characteristics of the load, parameters for determining addition of time for desired recovery may be set as a fixed value in advance, and it is not always necessary to uniformly set all notification timing determination conditions by self-accumulation learning.

The situation around the user's own car to be recognized include, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight motion, traveling operation, and the like. To cause the vehicle to safely travel, a control start point requiring measures greatly differs depending on a loading capacity mounted in a state specific to the vehicle, a chassis fixed state of a mounting unit, a decentered state of the center of gravity, a maximum decelerable acceleration value, a maximum loadable centrifugal force, a recovery response delay amount according to the state of the driver, and the like.

The situation recognition unit 153 supplies data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's own car on the basis of the data or signals from the units of the mobile device 100, such as the map analysis unit 151, the traffic rule recognition unit 152, and the situation recognition unit 153. For example, the situation prediction unit 154 performs processing of predicting the situation of the user's own car, the situation around the user's own car, the situation of the driver, and the like.

The situation of the user's own car to be predicted includes, for example, a behavior of the user's own car, occurrence of abnormality, a travelable distance, and the like. The situation around the user's own car to be predicted includes, for example, a behavior of a moving body around the user's own car, a change in a signal state, a change in the environment such as weather, and freezing of a road surface, snow, wetness, sand accumulation, and the like that occur as a result of the weather. The situation of the driver to be predicted includes, for example, a behavior of the driver and physical conditions of the driver, which may affect driving and steering characteristics.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The safety determination unit (learning processing unit) 155 has a function as a learning processing unit that learns optimal recovery timing according to a recovery action pattern of the driver, the vehicle characteristics, and the like, and provides learned information to the situation recognition unit 153 and the like. As a result, for example, it is possible to present to the driver statistically determined optimum timing required for the driver to normally recover from the automatic driving to the manual driving at a predetermined ratio or more.

The route planning unit 161 plans a route to a destination on the basis of the data or signals from the units of the mobile device 100, such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's own car for safely traveling in the route planned by the route planning unit 161 within a planned time on the basis of the data or signals from the units of the mobile device 100 such as the map analysis unit 151 and the situation prediction unit 154. For example, the action planning unit 162 makes a plan of starting, stopping, traveling directions (for example, forward, backward, turning left, turning right, turning, and the like), driving lane, traveling speed, passing, and the like. The action planning unit 162 supplies data indicating the planned action of the user's own car to the operation planning unit 163 and the like.

The operation planning unit 163 plans an operation of the user's own car for implementing the action planned by the action planning unit 162 on the basis of the data or signals from the units of the mobile device 100, such as the map analysis unit 151 and the situation prediction unit 154. For example, the operation planning unit 163 plans acceleration, deceleration, a traveling track, and the like. The operation planning unit 163 supplies data indicating the planned motion of the user's own car to an acceleration and deceleration control unit 172 and a direction control unit 173 of the operation control unit 135, and the like.

The operation control unit 135 controls the operation of the user's own car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a danger zone, driver's abnormality, vehicle's abnormality, and the like on the basis of the detection results of the vehicle exterior information detection unit 141, the vehicle interior information detection unit 142, and the vehicle state detection unit 143. In the case where the emergency avoidance unit 171 detects occurrence of the emergency situation, the emergency avoidance unit 171 plans the operation of the user's own car for avoiding the emergency situation, such as sudden stop or sharp turn. The emergency avoidance unit 171 supplies data indicating the planned operation of the user's own car to the acceleration and deceleration control unit 172, the direction control unit 173, and the like.

The acceleration and deceleration control unit 172 performs acceleration and deceleration for implementing the operation of the user's own car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107. Note that, there are two main cases where an emergency situation occurs. That is, there are a case where an unexpected accident has occurred due to a sudden reason during the automatic driving on a road on a traveling route, which is originally supposed to be safe according to the local dynamic map or the like acquired from an infrastructure and an emergency recovery cannot be in time, and a case where the driver has a difficulty in accurately recovering to the manual driving from the automatic driving.

The direction control unit 173 controls a direction for implementing the operation of the user's own car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

[3. Mode Switching Sequence from Automatic Driving Mode to Manual Driving Mode]

Next, a takeover sequence from the automatic driving mode to the manual driving mode will be described.

Figure 11:
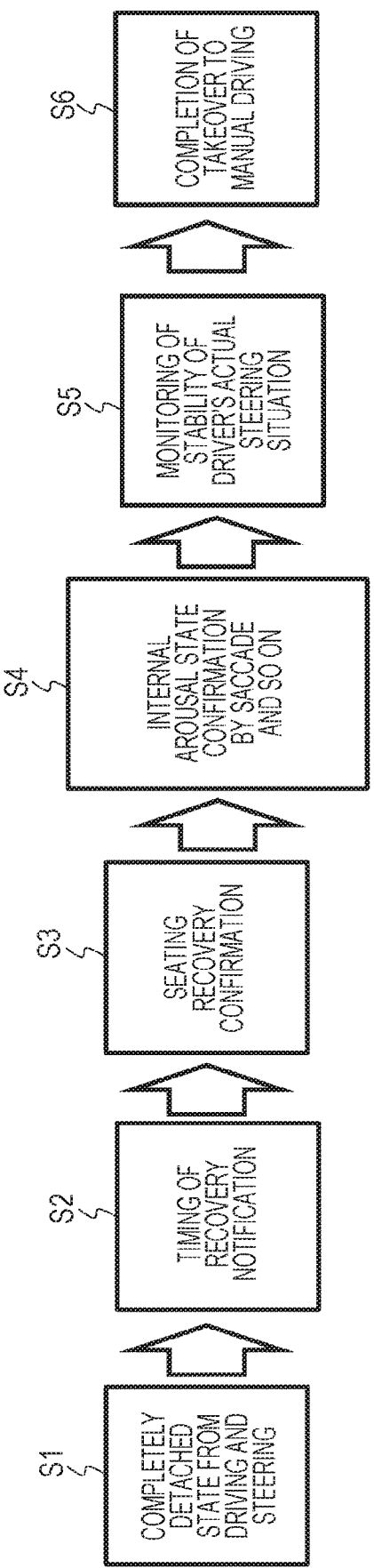
FIG. 11 is a diagram illustrating an example of a mode switching sequence from an automatic driving mode to a manual driving mode executed by the mobile device of the present disclosure.

FIG. 11 schematically illustrates an example of a mode switching sequence from the automatic driving mode to the manual driving mode in the automatic driving control unit 112.

In step S1, the driver is in a state of being completely detached from the driving and steering. In this state, for example, the driver can execute a secondary task such as taking a nap, watching a video, concentrating on a game, and working with a visual tool such as a tablet or a smartphone. The work using the visual tool such as a tablet or a smart phone may be performed, for example, in a state where the driver's seat is displaced or in a seat different from the driver's seat.

When the vehicle approaches a section requiring manual driving recovery on the route, it is assumed that the time until the driver recovers greatly varies depending on the operation content at that time. With the notification just before the approach to the event, the time is insufficient to recover. In a case where the notification is made too early with respect to the approach of the event with a margin, the time to the timing actually required for recovery may be too long, depending on the state of the driver. As a result, if the situation where the notification is not performed at appropriate timing repeatedly occurs, the driver loses the reliability for the notification timing of the system, and the driver's consciousness for the notification decreases, and the driver's accurate treatment is neglected, accordingly. As a result, the risk of failing in takeover is increased, and at the same time, it becomes a factor to hinder comfort execution of the secondary task. Therefore, to enable the driver to start accurate driving recovery to the notification, the system needs to optimize the notification timing.

Step S2 is the timing of the manual driving recovery request notification described above with reference to FIG. 2 and FIGS. 5, 6, 7A, and 7B. Notification of the driving recovery is issued to the driver using dynamic puptics such as vibration or a visual or auditory manner. The automatic driving control unit 112 monitors a steady state of the driver, for example, grasps the timing to issue the notification, and issues the notification at appropriate timing. That is, the system passively and constantly monitors the driver's secondary task execution state during the former passive monitoring period and can calculate optimal timing of the notification. It is desirable to continuously and constantly perform the passive monitoring in the period of step S1 and to calculate the recovery timing and issue the recovery notification according to recovery characteristics unique to the driver.

That is, it is desirable to learn the optimal recovery timing according to the recovery action pattern of the driver, the vehicle characteristics, and the like, and to present, to the driver, the statistically obtained optimal timing, which is required for the driver to normally recover from the automatic driving to the manual driving at a predetermined rate or higher. In this case, in a case where the driver does not responded to the notification for a certain period of time, a warning by sounding an alarm or the like is given.

In step S3, whether or not the driver has been seated and recovered is confirmed. In step S4, an internal arousal state of the driver is confirmed by analyzing a face or an eyeball behavior such as saccade. In step S5, stability of an actual steering situation of the driver is monitored. Then, in step S6, the takeover from the automatic driving to the manual driving is completed.

Figure 12:
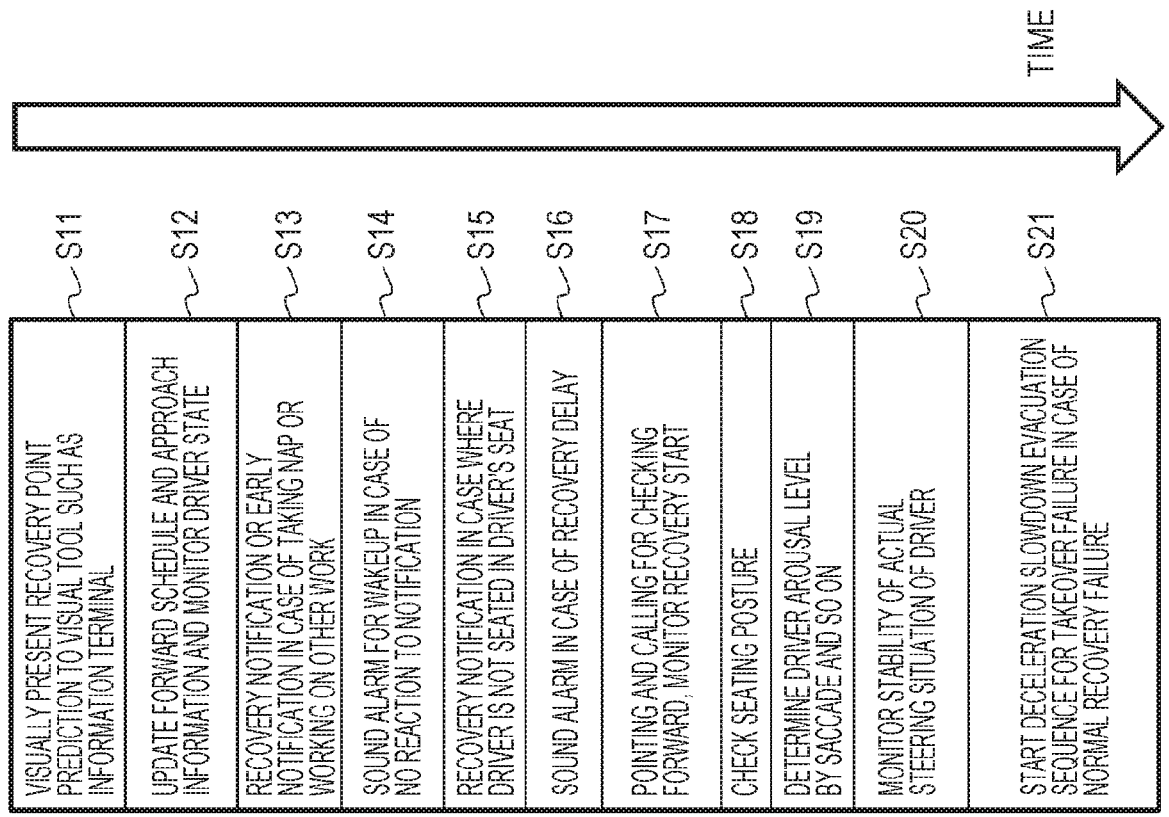
FIG. 12 is a diagram illustrating an example of a mode switching sequence from an automatic driving mode to a manual driving mode executed by the mobile device of the present disclosure.

FIG. 12 illustrates a further detailed example of the takeover sequence from the automatic driving to the manual driving. In step S11, prediction of a recovery point is visually presented to the above-described information terminal 50, or a visual tool such as a tablet or a smartphone. Note that, it is not necessary to limit the display to the visual tools, and a display form such as a center information display of the vehicle is desirable, which enters the driver's field of vision during execution of a secondary task. Although details will be described below, the forward schedule and approach information are presented, and the recovery point is displayed so as to approach the user's own car over time.

In step S12, presentation content of the forward schedule and approach information is changed as appropriate by updating a so-called local dynamic map (LDM) in which road environment information, for example, travel map information of roads on which the vehicle travels is updated with high density and on a constant basis. Furthermore, in this step S12, the state of the driver is regularly monitored.

In step S13, a time to a recovery point (a recovery point from the automatic driving to the manual driving) within a fixed time from the current point is displayed in a confirmable manner on the information terminal 50 worn by the driver. For example, examples are described with reference to FIGS. 6, 7A, and 7B. Moreover, when the time to the manual driving start position is within a predetermined time, the notification display requesting recovery to the manual driving described with reference to FIG. 5 is made. The timing of issuing the notification is adjusted such that the driver can recover in time by executing the notification early according to a detection result of the regular monitoring in the previous stage, that is, according to the depth of detachment from the driving by nap or a secondary task.

In step S14, if the driver does not respond to the notification, an alarm for waking up is sounded. In step S15, if the driver is not seated, the driver is visually or auditorily notified to recover. In step S16, in a case where there is a delay in returning to seating, a warning alarm is sounded. In step S17, for example, the driver's pointing and calling for checking forward is monitored as recovery start.

In step S18, the sitting posture is confirmed. In step S19, the internal arousal level of the driver is determined by perceptual reflexes such as saccade or fixation in order to detect recovery of an internal brain perception state of the driver, using a means such as a detailed line-of-sight analysis, for example. In step S20, the driver is sequentially entrusted with driving steering authority, the steering is entrusted while observing a response steering situation of an actual steering reaction, and the steering stability is monitored.

As a result of monitoring and observing the stability, if the driver's proactive driving steering recovery is not detected to the expected extent, it means that there is a risk that a dreaming state is still extended. Therefore, in step S21, when it is expected that normal recovery is impossible, it is determined that the emergency takeover has failed, and a deceleration slowdown evacuation sequence is started. Note that, although detailed description in each step is omitted, the notification is once made to the driver, and in a case where the recovery transition of the driver requires time than assumed recovery time and exhaustion risk of recovery time is estimated in each step of continuously monitoring the recovery transition, the deceleration may be started in stages. The actual deceleration amount is determined on the basis of optimization decision of influence in consideration of influence caused by the deceleration of the user's own vehicle.

The temporal transition for recovery varies by various factors such as age, experience, fatigue level of the driver, and is thus determined by recovery timing according to the individual. In the case where the driver is requested to recover from the automatic driving to the manual driving, it takes at least a certain time to almost certainly recover to the manual driving. The most desirable configuration is to notify the optimal timing according to vehicle characteristics, road characteristics, and personal driving recovery characteristics. By displaying the approach situation of a takeover point in conjunction with timing, the driver can feel relieved and gain convenience of being able to use the secondary task according to an allowable situation, and at the same time, since a tense state and a relaxed state appears alternately, the user can appropriately recover to the attention in each necessary section, which ergonomically leads to a suitable use. In other words, since the driver is free from unnecessary continuous tension, it is possible to reduce induction of drowsiness and distraction in the driver by allowing traveling under moderate caution from the automatic driving that continuously requires traveling under constant high caution for a long time.

The greatest effect of these procedures is to balance the secondary tasks in the user's state of tension and relaxation. In the conventional notification method of performing uniform notification based on position, there is no choice but to predict the actual takeover timing with the driver's sense. The driver has to keep the tension in mind while keeping an eye on when a request to take over is given, gets nervous, and as a result, there is a risk of becoming drowsy, distracted, and the like. In contrast, in the takeover timing notification to which the situation by the disclosed method is applied, there is an effect that the driver's continuous tension/attention state can be appropriately reduced according to a section. Note that, to maximize the effect, it is favorable to appropriately generate a dummy recovery request event in the middle of itinerary even in a section not requiring the driver's intervention over a long distance. Recovery level evaluation of the driver and aptitude reaction evaluation of the driver may be performed according to the recovery level of the driver to the dummy event, and recovery level evaluation values that occurs each time may be further recorded and stored. It is favorable to perform the active response evaluation of the driver using the dummy event when especially the driver passes through a section with a high event occurrence rate where it is difficult for the driver to handle with deep sleep. Furthermore, the evaluation may be executed for accurately monitoring the state of the driver when passing through a section not interfering with a secondary task that allows a relatively short-term recovery of several tens of seconds, or when leaving the driver's seat and working in the luggage compartment or the like. Alternatively, the evaluation may be executed to complementarily observe the driver's state when the system loses the driver's state at the time of detecting a passive part signal.

[4. Operation Sequence Example of Automatic Driving]

Next, an example of an operation sequence of the automatic driving will be described with reference to the flowchart illustrated in FIG. 13.

Figure 13:
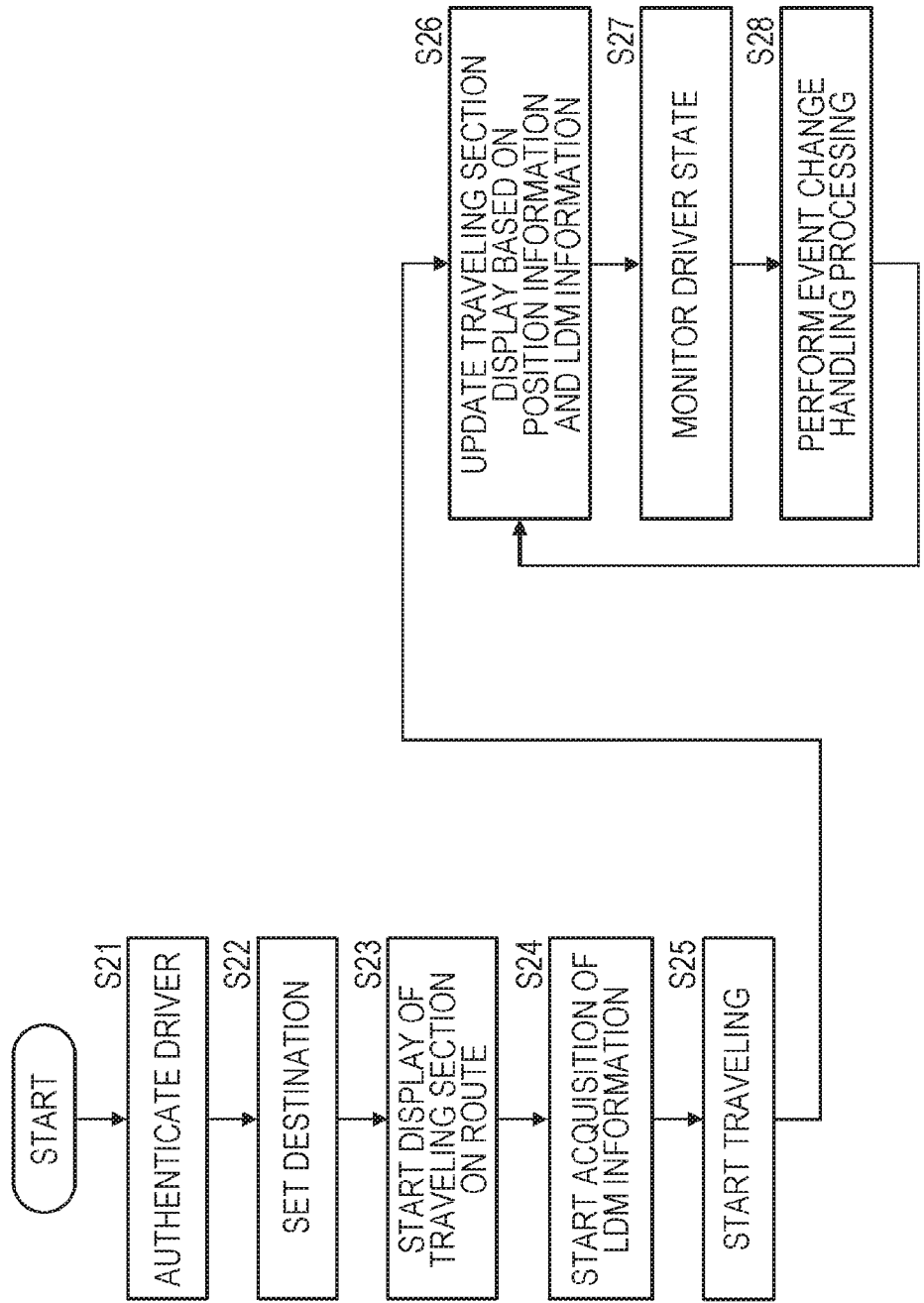
FIG. 13 is a diagram illustrating a flowchart for describing an example of an operation sequence of automatic driving.

The flowchart illustrated in FIG. 13 is a flowchart for describing the operation sequence of the automatic driving executed by the mobile device 100.

First, in step S21, driver authentication is performed. This driver authentication is performed using knowledge authentication using a password, a PIN, or the like, biometric authentication using the face, a fingerprint, an iris of a pupil, a voice print, or the like, or the knowledge authentication and the biometric authentication together. By performing the driver authentication in this way, information for determining the notification timing can be selected and accumulated in association with each driver even in a case where a plurality of drivers drives the same vehicle.

Next, in step S22, the driver operates the input unit 101 to set a destination. In this case, the driver's input operation is performed on the basis of display on an instrument panel.

Note that the present embodiment has been described assuming the case where the driver gets in the vehicle and sets the itinerary. However, the driver may remotely make a reservation in advance using a smartphone before getting in the vehicle or using a personal computer or a dedicated terminal before leaving home or a distribution center, for example. Moreover, the system of the vehicle may perform preplanning along a schedule assumed by the driver according to a schedule table, update and acquire the LDM information of the road environment, that is, the so-called local dynamic map (LDM) in which road traveling map information of the vehicle is updated with high density and on a constant basis, and display an advice of actual traveling at the time of or before getting in the vehicle, like a concierge, for example.

Next, in step S23, display of a traveling section on a traveling route is started. This traveling section is displayed on the instrument panel and is also displayed with a work window on a tablet or the like on which the driver performs a secondary task, for example. As a result, the driver working on the work window can easily recognize a driver intervention required section and an automatically drivable section on the traveling route on a predicted arrival time axis from the current point.

In the traveling section display, a forward schedule and approach information to each point are presented. In the traveling section display, the driver intervention required section and the automatically drivable section on the traveling route are displayed on the predicted arrival time axis from the current point. Then, the driver intervention required section includes a manual driving section, a takeover section from the automatic driving to the manual driving, and a cautioned traveling section from the automatic driving. Details of the traveling section display will be described below.

Next, in step S24, acquisition of LDM update information is started. With the acquisition of LDM update information, content of the traveling section display can be changed to the latest state. Next, in step S25, traveling is started. Next, in step S26, the traveling section display is updated on the basis of the position information of the user's own car and the acquired LDM update information. For example, the section information described with reference to FIGS. 6, 7A, and 7B is displayed on the information terminal 50.

Next, in step S27, the driver's state is monitored. Next, in step S28, event change handling processing is performed. The event change handling processing includes mode switching processing for responding to a case where a switching point between the automatic driving mode and the manual driving mode existing on the traveling route or the cautioned traveling section is approaching, event occurrence processing for responding to a case where the mode switching point or the driver intervention required section of the cautioned traveling section newly occurs on the traveling route, and the like. Hereinafter, the processes of steps S26 to S28 are appropriately repeated. In the case where there is an event change, it can be dealt with in step S28, and details will be described below.

Figure 14:
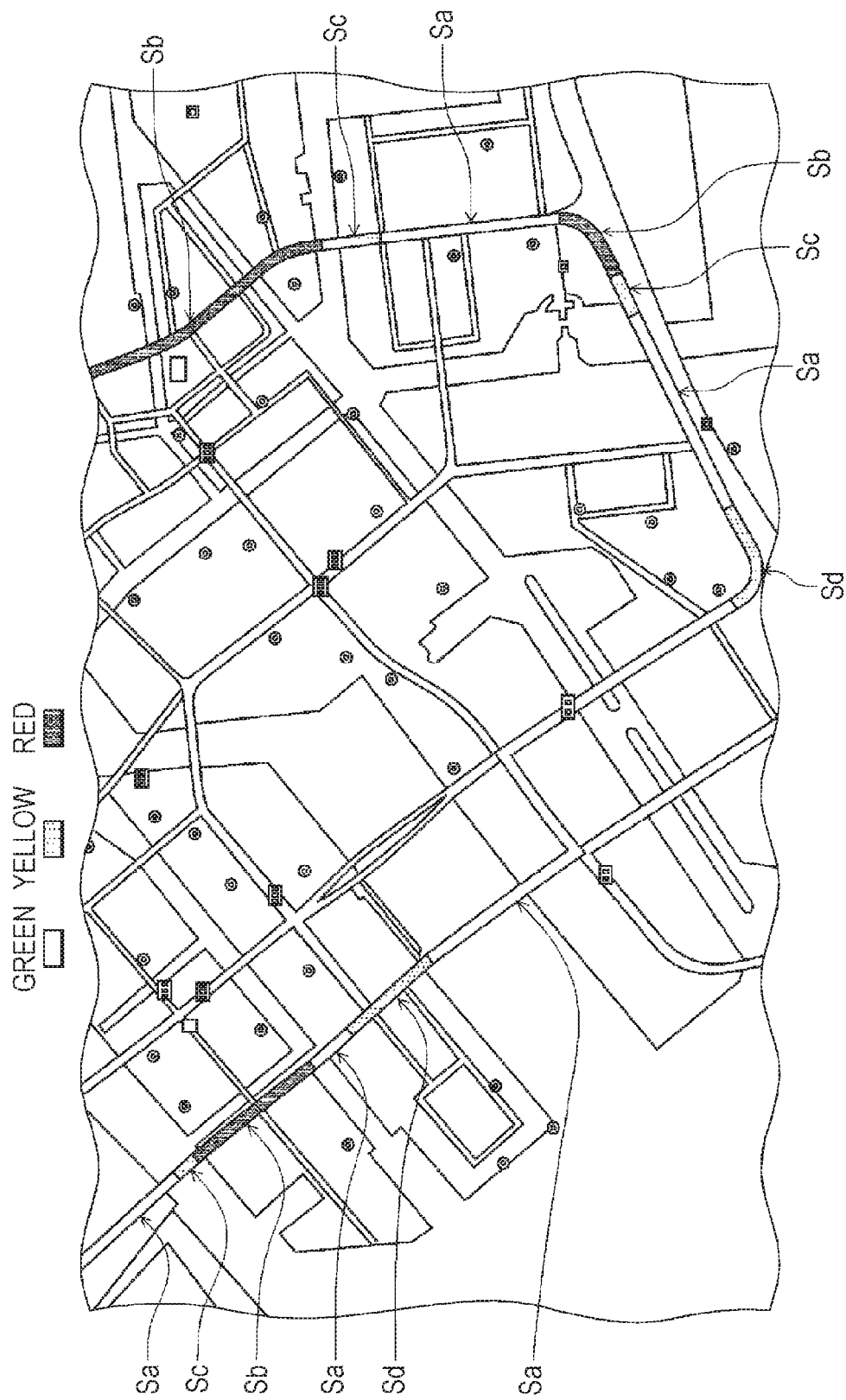
FIG. 14 is a diagram illustrating an example of a traveling route in which automatic driving available and unavailable sections determined as a driver sets a destination are set or determined in spots.

"Details of Traveling Section Display" FIG. 14 illustrates an example of the traveling route determined as the destination is determined by the driver. At least an automatic driving section Sa and a manual driving section Sb are set for the traveling route. Moreover, the example in FIG. 14 illustrates a configuration in which a takeover section Sc from the automatic driving to the manual driving and a cautioned traveling section Sd from the automatic driving are set in a case of assuming a route traveling counterclockwise. The traveling section information is information of takeover points presented to the traveling vehicle according to the operation of the user's own vehicle on the basis of the information recorded in the local dynamic map (LDM).

Here, the takeover section Sc exists immediately before the manual driving section Sb, and the driver needs to be in a recoverable state to the manual driving. Furthermore, the cautioned traveling section Sd is a section in which the vehicle can travel while decelerating while keeping the automatic driving under caution of the driver who is in the recoverable state to the manual driving. The display of the recovery notification point is not necessarily appropriate in the presentation of a relatively wide range of map information, and selective display may be performed. The reason is that the notification timing varies due to the secondary task that can be taken in each driving.

In the illustrated example, the automatic driving section Sa is illustrated in green, the manual driving section Sb is illustrated in red, and the takeover section Sc and the cautioned traveling section Sd are illustrated in yellow. Note that, for the sake of convenience, each color is represented by a different pattern.

As described with reference to FIGS. 6, 7A, and 7B, the section information is displayed on the display or the tablet of the information terminal 50 or the automobile 10. As described above with reference to FIGS. 6, 7A, and 7B, each section on the traveling route is displayed on the display device of the information terminal 50 and the like with the predicted arrival time axis from the current point. The data processing unit 11 of the automobile 10 illustrated in FIG. 1, specifically, the automatic driving control unit 112 of the mobile device 100 illustrated in FIG. 8 calculates an estimated arrival time of each section for displaying the traveling section on the traveling route on the basis of traveling route information and traffic information. This calculated data is transmitted to the information terminal 50 via the communication unit. The information terminal 50 performs the data display described with reference to FIGS. 6, 7A, and 7B, for example, on the basis of the received data.

Figure 15:
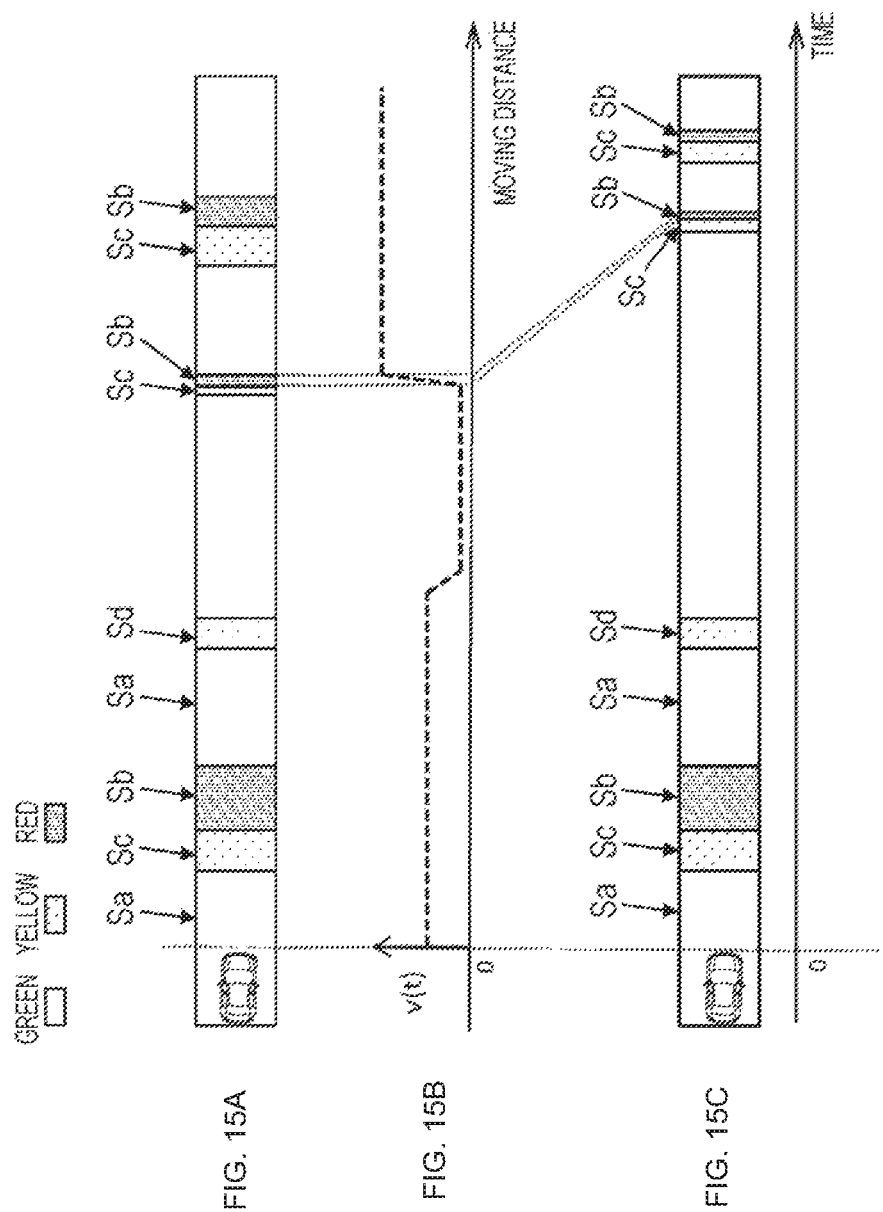
FIGS. 15A, 15B, and 15C are diagrams for describing an example of display data of the information terminal of the present disclosure.

Details of the data displayed on the information terminal 50 will be described with reference to FIGS. 15A, 15B, 15C. FIGS. 15A, 15B, 15C illustrate a linearly converted traveling route of the automobile.

FIG. 15A illustrates each section on the traveling route on a constant scale with a moving distance axis from the current point. FIG. 15B illustrates an average vehicle flow velocity v(t) at each point. The data in FIG. 15B can be acquired by the automobile 10 by receiving the LDM distributed by a local dynamic map (LDM) distribution server. FIG. 15C is a diagram in which each section represented by the moving distance axis is converted into a time axis using the velocity v(t). The data processing unit 11 of the automobile 10 illustrated in FIG. 1 generates data FIG. 15C from data illustrated in FIGS. 15A and 15B. As a result, each section on the traveling route is represented by the predicted arrival time axis from the current point. That is, each section on the traveling route can be represented by the time axis obtained by dividing the physical distance of the traveling route by the average velocity of each corresponding section. The data processing unit 11 of the automobile 10 transmits the generated data to the information terminal 50 via the communication unit. The information terminal 50 performs the data display described with reference to FIGS. 6, 7A, and 7B, for example, on the basis of the received data.

The display data of the information terminal 50 described with reference to FIGS. 6, 7A, and 7B is data obtained by converting the data illustrated in FIG. 15C into a pie chart and making the data correspond to the time axis (360 degrees=10 minutes) of the information terminal 50.

Figure 16:
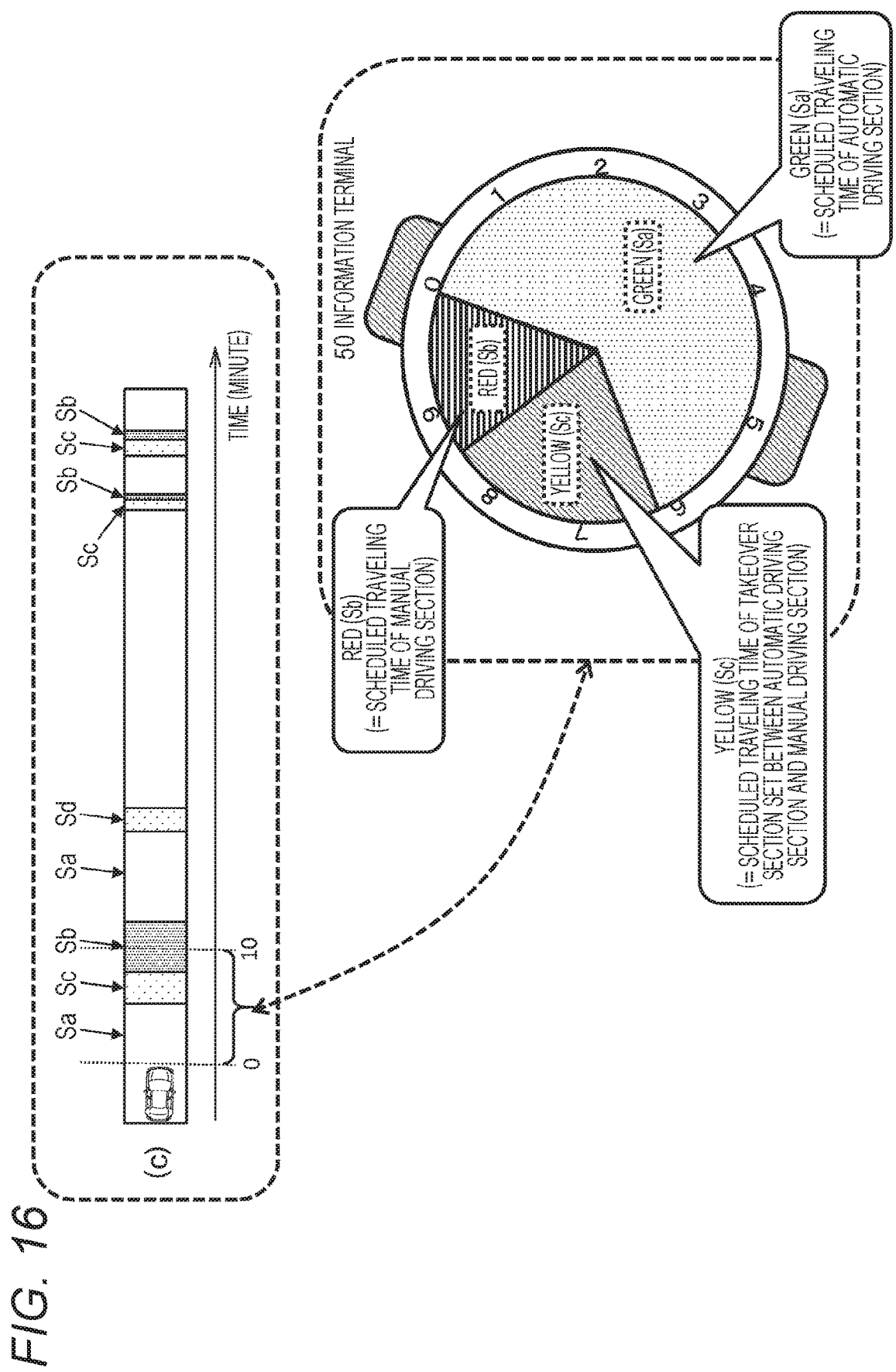
FIG. 16 is a diagram for describing an example of the display data of the information terminal of the present disclosure.

FIG. 16 illustrates a correspondence example between the data in FIG. 15C and the display data of the information terminal 50. As illustrated in FIG. 16, the display data of the information terminal 50 illustrated in FIG. 16 is data obtained by converting the data (c) of 0 to 10 (minutes) on the time axis into a pie chart and making the data correspond to the time axis (360 degrees=10 minutes) of the information terminal 50.

The driver 20 can grasp the remaining time to the manual driving section by seeing the display data of the information terminal 50. Since the information terminal 50 is a wearable terminal worn on the arm of the driver 20, even when the driver 20 is away from the driver's seat and working, the remaining time to the manual driving section can always be confirmed. Furthermore, as described above, the information terminal 50 has an alarm output function and a vibration function, and for example, when the remaining time to the manual driving section Sb (=red display) reaches a predefined time (for example, 1 minute), the information terminal 50 outputs an alarm and activates vibration to warn the driver 20. An optimum execution time of the alarm and notification will be described below. First, a case of using a fixed value will be described. Note that, at the time of warning output, the display of the information terminal 50 may be switched to the notification screen for switching the automatic driving to the manual driving described above with reference to FIG. 5. However, when switching is performed, the remaining time to the manual driving section cannot be checked. Therefore, it is favorable to perform processing such as semi-transparent display of the switching notification or displaying the remaining time in a part of the display area. Note that the alarm, vibration, display switching processing, and timing can be changed or stopped according to user settings.

Figure 17:
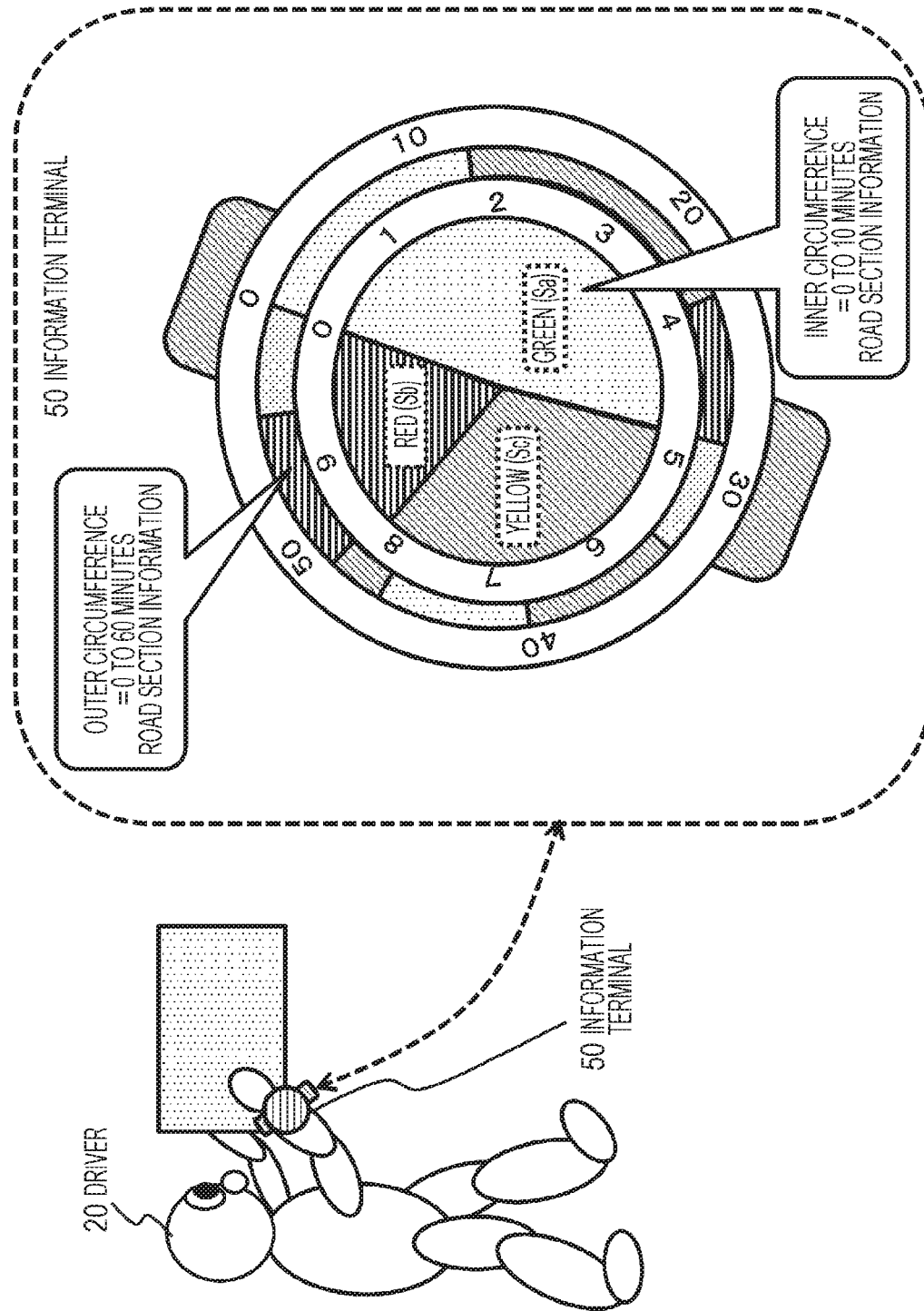
FIG. 17 is a diagram for describing an example of the display data of the information terminal of the present disclosure.

The display unit of the information terminal 50 may be configured to perform the display illustrated in FIG. 17, in addition to the display illustrated in FIG. 16, for example. The display example of the information terminal 50 illustrated in FIG. 17 is a display configuration in which the road section information of 0 to 10 minutes from the present time (the automatic driving section, the manual driving section, and the like) is displayed in an inner circumference of the display unit of the information terminal 50, and the road section information of 0 to 60 minutes from the present time or from a point thereafter (the automatic driving section, the manual driving section, and the like) is displayed in an outer circumference. By the display, the driver 20 can visually and intuitively recognize the road section information of 0 to 60 minutes from the present time in addition to the road section information of 0 to 10 minutes from the present time.

Figure 18:
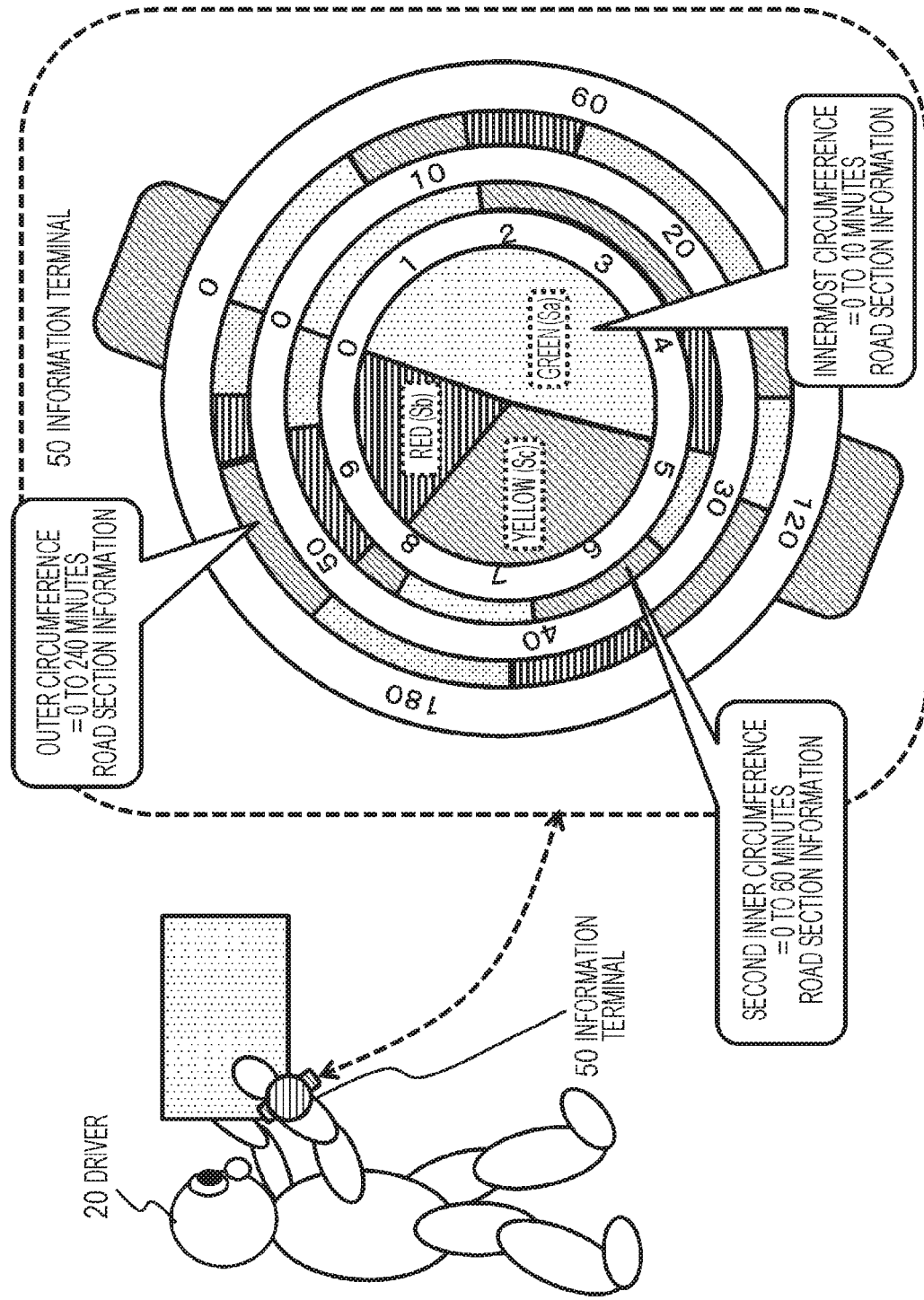
FIG. 18 is a diagram for describing an example of the display data of the information terminal of the present disclosure.

Moreover, the configuration of performing the display in FIG. 18 may be adopted. The display example of the information terminal 50 illustrated in FIG. 18 is a display configuration in which the road section information of 0 to 10 minutes from the present time (the automatic driving section, the manual driving section, and the like) is displayed in an innermost circumference of the display unit of the information terminal 50, the road section information of 0 to 60 minutes from the present time (the automatic driving section, the manual driving section, and the like) is displayed in a second inner circumference outside the innermost circumference, and the road section information of 0 to 240 minutes from the present time (the automatic driving section, the manual driving section, and the like) is displayed in an outer circumference outside the second inner circumference. By the display, the driver 20 can grasp the road section information of 0 to 60 minutes and 0 to 240 minutes from the present time in addition to the road section information of 0 to 10 minutes from the present time. By the display processing using these plural time axes, the driver can know the timing to recover in a bird's eye view manner, and an action plan becomes easy. Furthermore, the information understood by the brain becomes multidimensional, and it becomes easy to understand multidimensional information such as arrival time of each section, importance of intervention, intervening period, and intermediate distribution of intervening points.

[5. Sequence of Processing Executed by Mobile Device and Information Processing Device (Information Terminal) of Present Disclosure]

Next, a sequence of processing executed by the mobile device and the information processing device (information terminal) of the present disclosure will be described.

Figure 19:
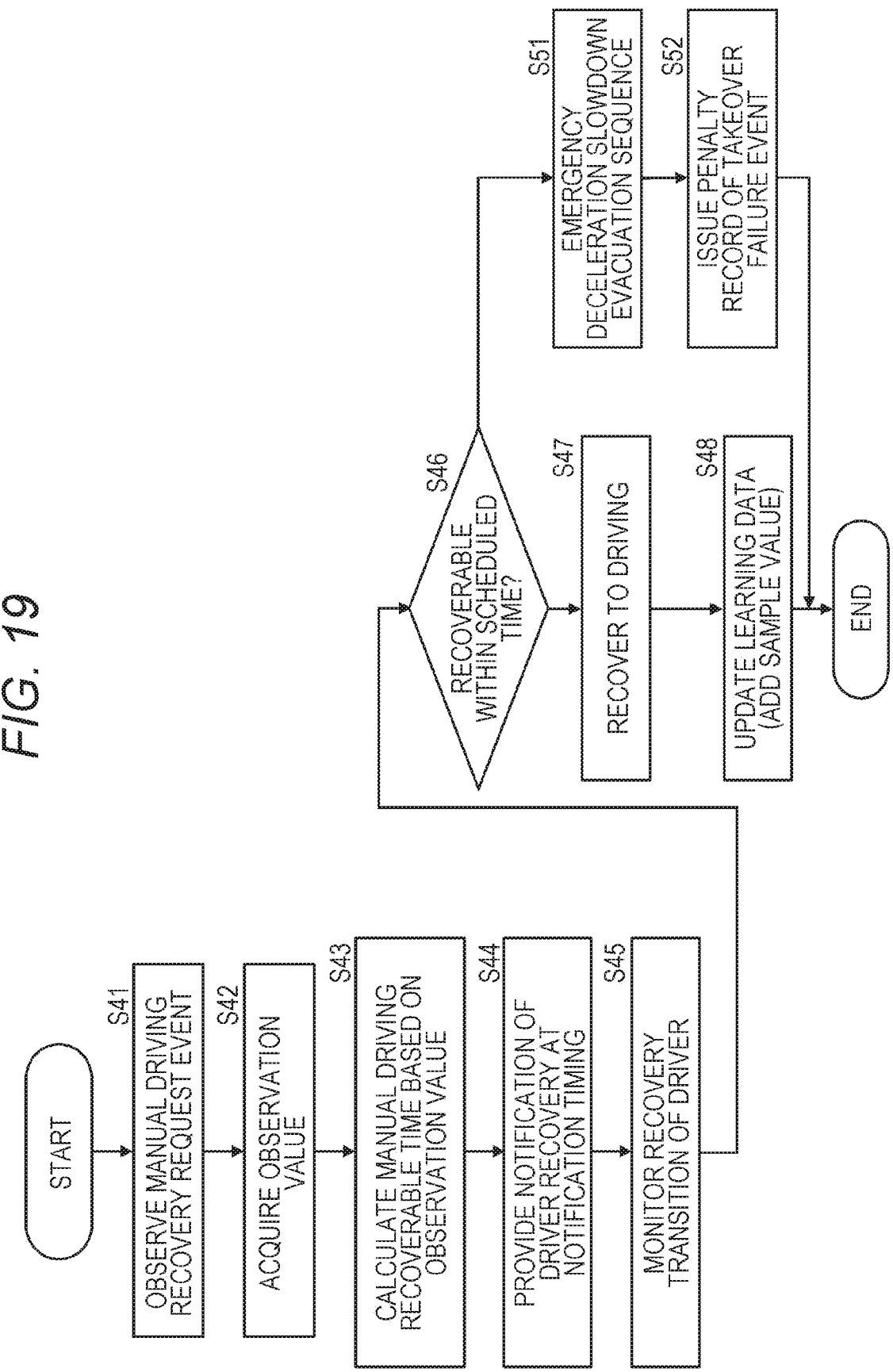
FIG. 19 is a diagram illustrating a flowchart for describing an example of a sequence of processing executed when switching the automatic driving mode to the manual driving mode.

The flowchart illustrated in FIG. 19 is a flowchart for describing an example of a sequence of processing executed when an automobile as the mobile device of the present disclosure switches the automatic driving mode to the manual driving mode.

In step S41, the mobile device observes the occurrence event of the request for switching the automatic driving mode to the manual driving mode.

This observation information is information acquired from the local dynamic map (LDM) that holds the road environment information and the like distributed by the local dynamic map (LDM) distribution server to the automobile. That is, the observation information is acquired on the basis of the local dynamic map (LDM) information in which the travel map information of roads on which the vehicle travels is updated with high density and on a constant basis.

As a specific example, for example, in the case where a schedule to start entry to a general road from a highway is acquired on the basis of the LDM, it is determined that occurrence of an event of requesting switching from the automatic driving mode to the manual driving mode.

Next, in step S42, the observation value is acquired. The observation value acquisition processing is performed, for example, in the driver information acquisition unit 12 and the environment information acquisition unit 13 of the automobile 10 illustrated in FIG. 1 and further using the biosensor (see FIG. 10) of the information terminal 50, and the like. Note that the information terminal 50 of the automobile 10 executes communication constantly or intermittently to transmit or receive information required by both devices.

The driver information acquisition unit 12 of the automobile 10 includes a camera and various sensors, and acquires the driver information, such as information for determining the arousal level of the driver, for example. The information is, for example, a line-of-sight direction, an eyeball behavior, and a pupil diameter acquired from an image including an eyeball area, and a facial expression acquired from an image including a face area. The driver information acquisition unit 12 further acquires the operation information of the operation units (steering wheel, accelerator, brake, and the like) of the driver.

The environment information acquisition unit 13 acquires, for example, an image by an imaging unit installed in the mobile device, depth information, three-dimensional structure information, topographical information by sensors such as an LiDAR installed on a moving body, position information by a GPS, traffic light conditions, sign information, information from a communication device installed on an infrastructure such as a road, and the like.

Next, in step S43, the manual driving recoverable time is calculated on the basis of the acquired observation value.

This processing is processing executed by the data processing unit 11 illustrated in FIG. 1.

The data processing unit 11 illustrated in FIG. 1 receives, for example, the driver information acquired by the driver information acquisition unit 12, the environment information acquired by the environment information acquisition unit 13, and the position and biometric information of the driver acquired by the information terminal 50 as inputs. Moreover, the data processing unit 11 estimates the time (=manual driving recoverable time) required by safe manual driving recovery on the basis of the current driver information and environment information, using the learning result corresponding to the driver in the data processing unit 11 (the safety determination unit (learning processing unit) 155 in FIG. 8) or the learning result corresponding to the driver acquired from the external server 30.

Note that, in the processing of estimating the time (=manual driving recoverable time) required by the safe manual driving recovery, the position of the driver acquired by the information terminal 50 is also taken into consideration. That is, in the case where the driver 20 is at a position distant from the driver's seat, for example, in the luggage compartment 21, the time is calculated in consideration of the time to return to the driver's seat.

The learning result corresponding to the driver in the data processing unit 11 of the automobile 10 illustrated in FIG. 1 (the safety determination unit (learning processing unit) 155 illustrated in FIG. 8), or the learning result corresponding to the driver acquired from the external server 30 is learning data based on past driving data of the driver and is stored in the storage unit of the automobile 10 or the storage unit of the server 30. As a learning method to be applied, for example, Support Vector Machine, Boosting, Convolutional Neural Network, Deep Belief Network, Long Short-Term Memory, or the like can be considered.

The data processing unit 11 of the automobile 10 illustrated in FIG. 1 (safety determination unit (learning processing unit) 155 illustrated in FIG. 8) estimates the time (=manual driving recoverable time) required by the safe manual driving recovery, using the learning data and the input data (driver information and environment information).

Note that the learning device used in the processing of estimating the manual driving recoverable time can be set for each driver or set to include the type of the secondary information during the automatic driving to the observation information.

In this case, the processing (manual driving recoverable time estimation processing) using the personal identification information of the driver who is currently driving and the information of the type of the secondary task being currently executed as the observation information is performed.

Figure 20B:
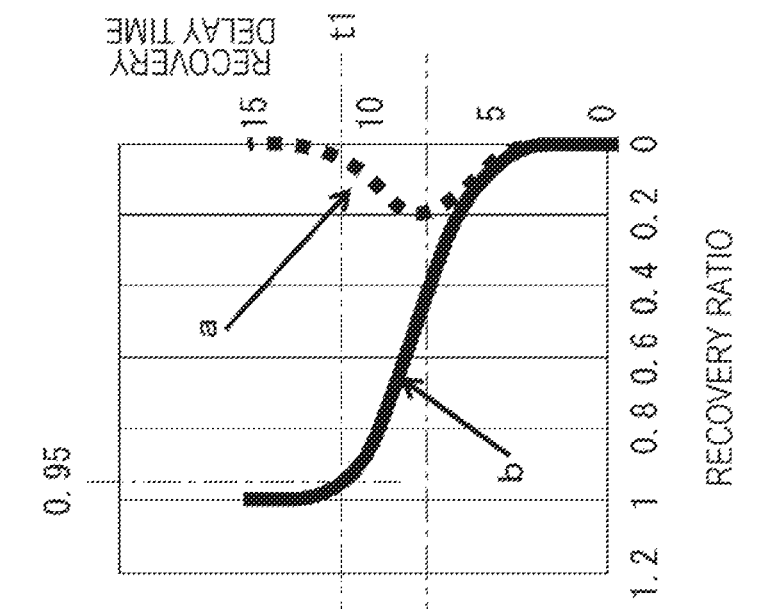
FIGS. 20A and 20B are graphs for describing a distribution example of a plurality of pieces of relationship information (observation plots) between an observable evaluation value corresponding to an observation value and a recovery delay time (=manual driving recoverable time), and a recovery ratio.
Figure 20A:
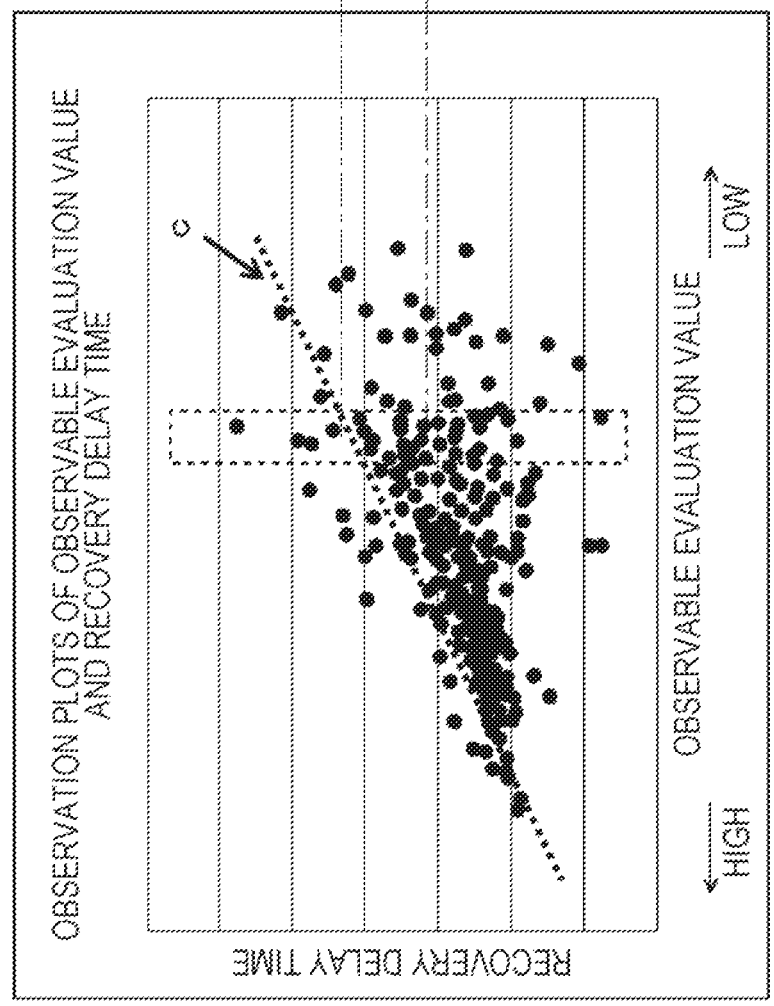

FIG. 20A illustrates an example of distribution of a plurality of pieces of relationship information (observation plots) between the observable evaluation value corresponding to an observation value and the recovery delay time (=manual driving recoverable time). This example corresponds to a type of a certain secondary task of a certain driver. To calculate the recovery delay time from the plurality of pieces of relationship information (observation plots), the relationship information (observation plot) in an area (illustrated by the broken-line rectangular frame) having a certain width in an evaluation value direction corresponding to the acquired observation value is extracted. A dotted line c in the figure represents a boundary line of when the recovery delay time at which the recovery ratio is 0.95 in FIG. 20B described below is observed with different observation values of the driver.

By issuing the recovery notification from the automatic driving to the manual driving or an alarm to the driver for a longer time, that is, in an earlier time, than the dotted line c, the driver's successful recovery from the automatic driving to the manual driving is secured at the ratio of 0.95 or higher. Note that a target value (request for recovery ratio) for allowing the driver to normally recover from the automatic driving to the manual driving for each corresponding section is determined by the roadside from the necessity of infrastructure, for example, and is provided to the individual vehicle passing through the section Note that, in a case where the vehicle does not interfere with surroundings even if the vehicle stops on the road, the vehicle is only required to be stopped, or the vehicle is only required to be decelerated to the speed handleable by the system. Normally, stopping a vehicle on a traveling road is not always desirable, and therefore, a high recovery ratio is desirable as a default setting. In particular, in a specific route such as metropolitan expressway, an extremely high recovery ratio may be required even if the infrastructure does not provide update information.

FIG. 20B illustrates a relationship between the recovery delay time and the recovery ratio obtained from the plurality of pieces of extracted relationship information (observation plots). Here, a curve a illustrates an independent success ratio at each recovery delay time, and a curve b illustrates a cumulative success ratio at each recovery delay time. In this case, a recovery delay time t1 is calculated such that the success ratio becomes a predetermined ratio, that is, the success ratio becomes 0.95 in the illustrated example, on the basis of the curve b.

This calculation processing is executed in the data processing unit 11 of the automobile 10 in FIG. 1 (safety determination unit (learning processing unit) 155 in FIG. 8). For example, the calculation processing is performed using the distribution information of the plurality of pieces of relationship information (observation plots) between the observable evaluation value and the recovery delay time stored in and acquired from the storage unit in the past.

Figure 21:
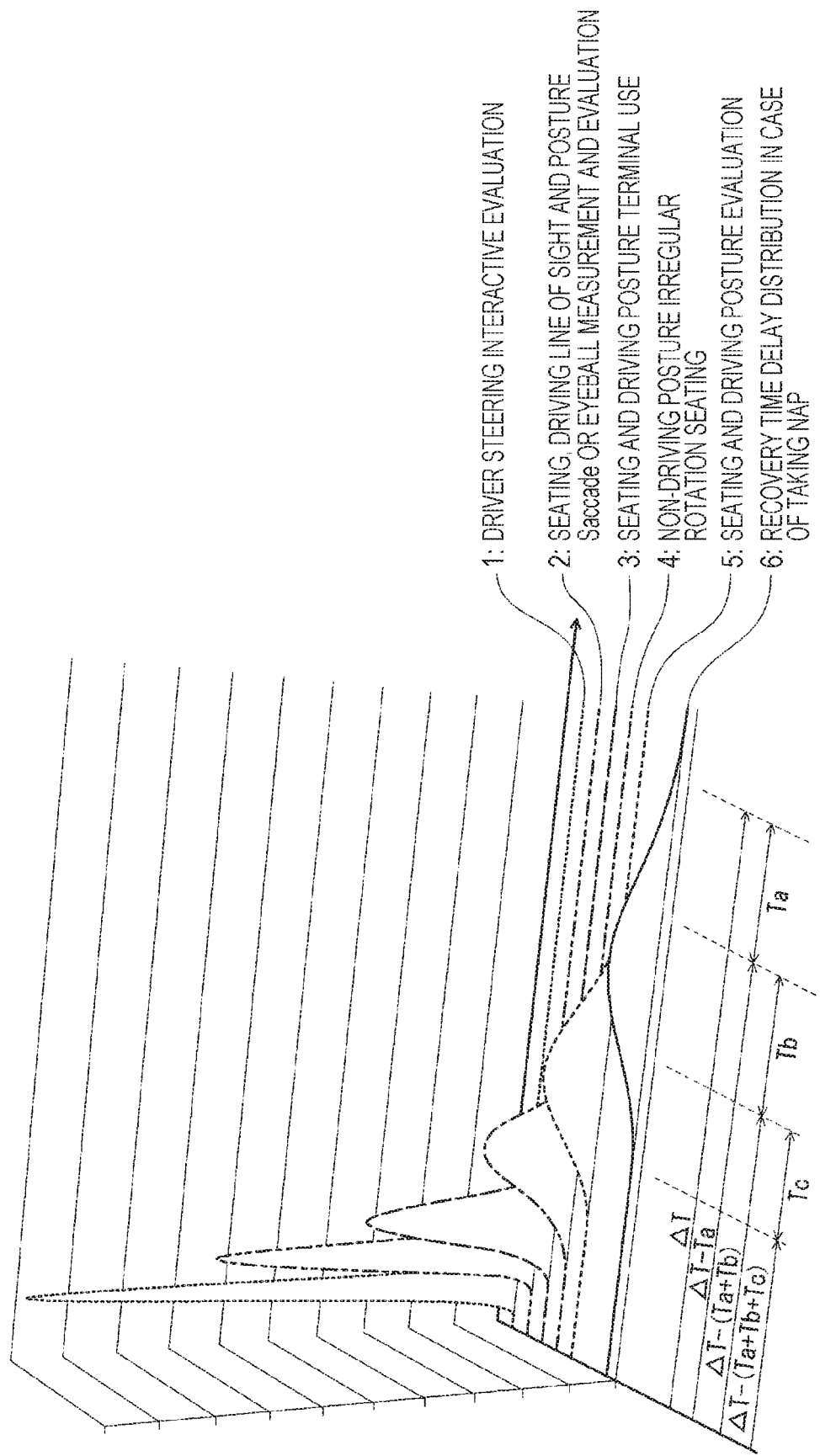
FIG. 21 is a graph for describing a manual driving recoverable time according to a type of processing (secondary task) executed by a driver in the automatic driving mode.

FIG. 21 is a graph for describing the manual driving recoverable time according to a type of processing (secondary task) executed by the driver in the automatic driving mode when the driver is detached from the driving and steering operation.

Each distribution profile corresponds to the curve a illustrated in FIG. 20B, which is predicted on the basis of the observed value, that is, the driver state. That is, to complete the takeover from the automatic driving to the manual driving at the takeover point with a necessary recovery ratio, whether or not a state actually reaches a necessary state required for recovery at each recovery stage is monitored until the takeover is completed on the basis of the time t1 when the profile (the recovery ratio profile in FIG. 20B) becomes a desired value by reference to the past characteristics required for the driver to recovery, from observation values capable of evaluating the arousal level of the driver detected at each stage.

For example, the initial curve in the case of taking a nap has cumulative average distribution in the case of estimating a sleep level from observation information such as breathing and pulse waves that are passively monitored during the nap period in the automatic driving, and viewing recovery delay characteristics of the driver after issuing a wakeup alarm. Each halfway distribution is determined according to the driver's state observed after the driver wakes up and in a subsequent movement recovery procedure. "6. In the case of taking a nap" illustrated in the drawing is observed and the right timing in time for the wakeup alarm is determined, and a halfway process thereafter shows the recovery time distribution in a recovery budget predicted from an observable driver state evaluation value at a predicted intermediate point.

Observation as to not violating a remaining takeover time limit, which gradually decreases until the takeover, is continued halfway, and in the case where there is a violation risk, the vehicle is decelerated, and a time delay is generated, for example. Note that, for example, regarding distribution of recovery starting from "4. Non-driving posture irregular rotation seating" without the steps of "6. In the case of taking a nap" and "5. Seated", the process of recovery starts from initial situation recognition grasping. Therefore, in the case of starting from the situation recognition in the "4. Non-driving posture irregular rotation seating" posture from the beginning, the time to recognize the situation is long. Whereas in the state of "4. Non-driving posture irregular rotation seating" posture as an on-going process starting from "6. In the case of taking a nap", the thinking process is in a recovery consciousness process even through the item is the same.

Note that the relationship information between the observable evaluation value and the recovery delay time of the driver currently driving may not be sufficiently stored in the storage unit. In that case, for example, recovery characteristic information generated on the basis of information collected from driver population of the same age group is stored in the storage unit, and the recovery delay time t1 can be calculated using the recovery characteristic information as assumed distribution information of recovery provided in advance. In the recovery information, the driver specific characteristics have not sufficiently been learned. Therefore, the same recovery ratio may be used on the basis of the information, or a higher recovery ratio may be set. Note that an ergonomically inexperienced user is expected to recover early in the beginning of use because the user is cautious. Then, the driver himself/herself adapts to the action in accordance with the notification of the system as he/she gets accustomed to the system. Note that, in the case of using different vehicles in logistics business that operates many vehicles, in vehicle operation business that operates buses, taxis, or the like, or sharing cars and rental cars, personal authentication of the driver is performed, the observable information and recovery characteristics of driving are managed and learned in a concentrated or distributed manner on a remote server or the like, and the data of the recovery characteristics is not necessarily stored in the individual vehicles and may be remotely learned and processed, and stored.

Furthermore, because the notification timing is important, the recovery ratio has been described using the uniform time to success or failure. However, the success or failure from the automatic driving to the manual driving is not limited to the binary success or failure, and determination further extended to recovery takeover quality may be made. That is, delay time of recovery procedure transition to actual recovery confirmation, recovery start delay to the notification, stagnation in a halfway recovery operation, and the like within allowed time may be further input to the learning device as recovery quality evaluation values.

Referring back to FIG. 19, the description of the flow will be continued. In step S44, a notification for prompting the driver to recover to driving is executed at the notification timing determined according to the recovery delay time calculated in step S43, that is, timing when an event to be taken over (the takeover section from the automatic driving to the manual driving or the cautioned traveling section from the automatic driving) approaches the recovery delay time. This notification is executed as the display processing described above with reference to FIG. 2 or the display processing for the information terminal 50 described with reference to FIG. 5, for example. Moreover, the notification may be executed as sound or alarm output, or vibration of the steering wheel, the seat, the information terminal 50, or the like. For example, in the case where the driver is taking a nap, a notification method for waking the driver from the sleeping state is selected.

As described above, the mobile device (automobile 10) determines the notification timing of the manual driving recovery request notification on the basis of the information of at least either the arousal level or the position of the driver, and transmits the determined notification timing to the information terminal 50. Note that the notification timing may be determined in consideration of a safety coefficient affected by the state of the vehicle, the load, or the like. The information terminal 50 executes the manual driving recovery request notification at the notification timing received from the mobile device. That is, the information terminal 50 executes at least one of the display processing, the alarm output, or the vibration activation described with reference to FIG. 5 at the notification timing determined by the mobile device.

Next, in step S45, the recovery transition of the driver is monitored. Then, in step S46, whether or not the driver can recover to driving within the recovery delay time on the basis of a monitoring result in step S45. When it is determined that the driver can recover to driving, the driver recovers to driving in step S47. Then, in step S48, the learning data is updated. That is, one sample value of the relationship information (observation plot) between the observable evaluation value and the actual recovery delay time regarding the initial type of the secondary task of the driver when the above-described recovery to driving is performed is added. After that, the processing is terminated. Note that, in the present embodiment, the learning is limited to the plot data generated at each event. However, in reality, the learning largely depends on the previous state (history) until the event occurs. Therefore, the estimation accuracy of the recovery delay required time from the observation value of the driver state may be further improved by performing multidimensional learning.

Furthermore, when it is determined that recovery to driving is not possible in step S46, a deceleration slowdown evacuation sequence is executed from the start to stop in step S51. Next, in step S52, a record of penalty for occurrence of a takeover defect event is issued, and the processing is terminated. Note that the record of the penalty is stored in the storage unit.

As described above, in the case of a wristwatch-type device, for example, the driver can always wear the device, and various advantages are generated by providing the device with a driver state input function. For example, history information of the driver's activity and biometric information before boarding the vehicle can be acquired. For example, various types of prior information that may affect the driving characteristics after boarding, such as fatigue status, break acquisition history, and physical condition, can be acquired. Furthermore, in the user authentication, pulse waveforms or the like can be used. Furthermore, as an advantage of the wearable terminal, the driver's recognition for the notification information from the vehicle side system can be confirmed. The driver's recognition for the notification and detection of a target action by the system are extremely important. In a case where the driver's action is not appropriate for the event notification to recover, the system needs to issue an alarm as a countermeasure for the delay in handling, cause deceleration or take an emergency action to gain time. The system needs to make a determination therefor. Furthermore, by providing a driver's action detection function such as an accelerometer, a gyro sensor, or a position detector, in addition to the detection function of the driver's response input in the wearable device, the driver's behavior and state can be observed, and whether or not the driver has responded or appropriately responded to the system notification can be detected.

[6. Configuration Example of Information Processing Device]

The above-described processing can be executed by applying the configurations of the mobile device 100 and the information terminal 50 having the configuration described with reference to FIG. 8. Note that part of the processing can be executed by applying the configurations of the information processing device attachable to and detachable from the mobile device and the information terminal 50, for example.

A hardware configuration example of the information terminal 50 and the information processing device attachable to and detachable from the mobile device will be described with reference to FIG. 22.

Figure 22:
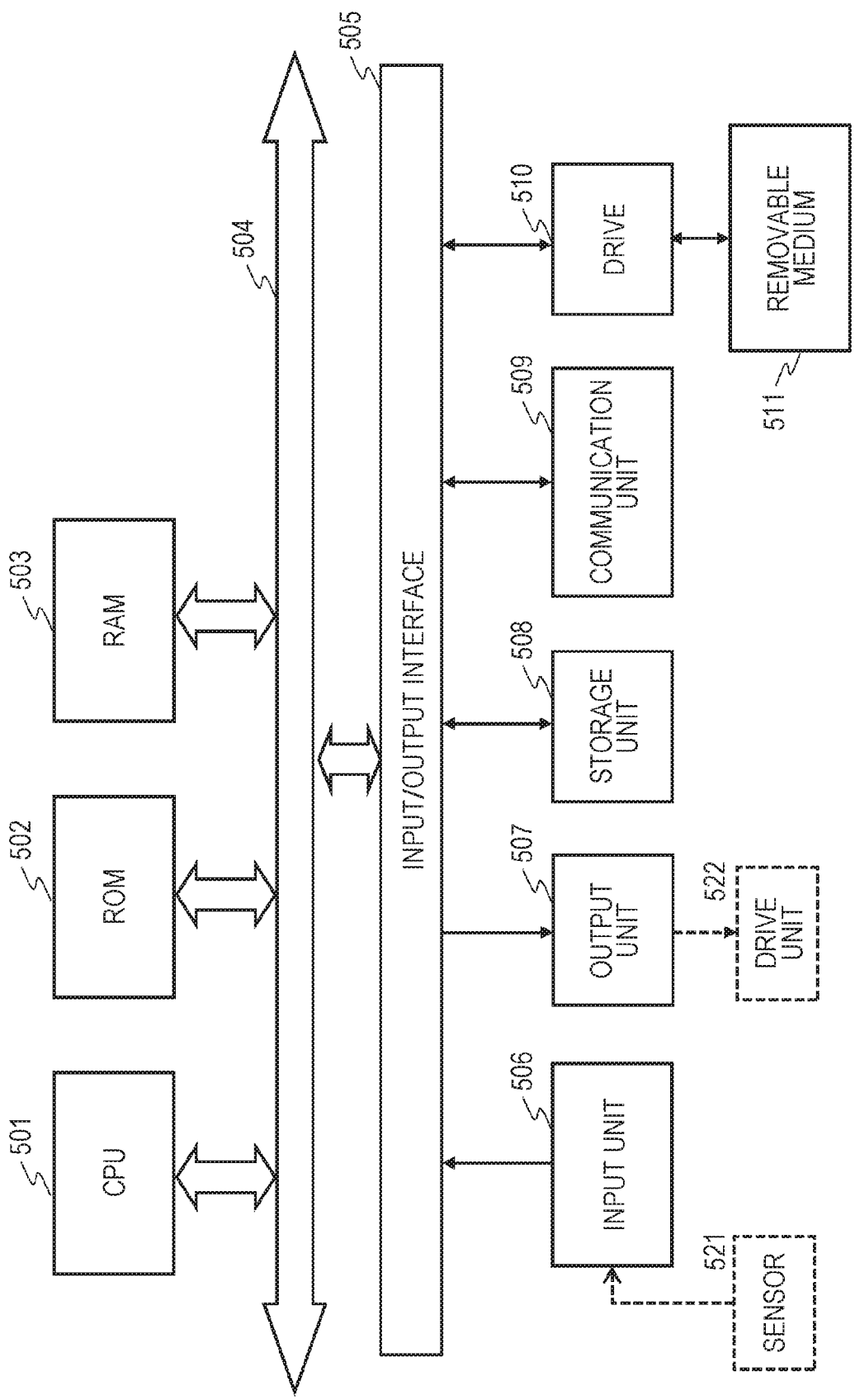
FIG. 22 is a diagram for describing a hardware configuration example of an information processing device.

FIG. 22 is a diagram illustrating an example of a hardware configuration applicable as the information terminal 50 and the information processing device attachable to and detachable from the mobile device.

A central processing unit (CPU) 501 functions as a data processing unit that execute various types of processing according to a program stored in a read only memory (ROM) 502 or a storage unit 508. For example, the CPU 501 executes processing according to the sequence described in the above embodiment.

A random access memory (RAM) 503 stores the program executed by the CPU 501, data, and the like. These CPU 501, ROM 502, and RAM 503 are mutually connected by a bus 504.

The CPU 501 is connected to an input/output interface 505 via the bus 504. An input unit 506 including various switches, a keyboard, a touch panel, a mouse, a microphone, and a state data acquisition unit such as a sensor, a camera, and GPS, and an output unit 507 including a display, a speaker, and the like are connected to the input/output interface 505.

Note that input information from a sensor 521 is also input to the input unit 506.

Furthermore, the output unit 507 also outputs drive information for a drive unit 522 of the mobile device.

The CPU 501 receives commands, state data, and the like input from the input unit 506, executes various types of information, and outputs processing results to the output unit 507, for example.

The storage unit 508 connected to the input/output interface 505 includes, for example, a hard disk and the like, and stores the program executed by the CPU 501 and various data. A communication unit 509 functions as a transmission/reception unit for data communication via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card, and executes data recording or reading.

[7. Conclusion of Configurations of Present Disclosure]

The examples of the present disclosure have been described in detail with reference to the specific examples. However, it is obvious that those skilled in the art can make modifications and substitutions of the examples without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present specification can have the following configurations.

(1) An information processing device that is a wearable terminal wearable on a human body, the information processing device including:
a display unit configured to output section information of an automatic driving section and a manual driving section on a traveling route of a mobile device, and display data by which a time to reach each section is confirmable.

(2) The information processing device according to (1), in which
the display unit further outputs display data by which an output time of a recovery request notification to manual driving is confirmable.

(3) The information processing device according to (1) or (2), in which
the display unit displays different pieces of the section information according to individual time axes in an inner peripheral portion and an outer peripheral portion.

(4) The information processing device according to any one of (1) to (3), in which
the display unit displays different pieces of the section information according to three or more individual time axes from an inner peripheral portion to an outer peripheral portion.

(5) The information processing device according to any one of (1) to (4), further including:
a sensor configured to detect a state of a terminal wearer; and
a communication unit configured to transmit detection information of the sensor to the mobile device.

(6) The information processing device according to any one of (1) to (5), further including:
a biosensor configured to detect a motion of a terminal wearer; and
a communication unit configured to transmit detection information of the biosensor to the mobile device.

(7) The information processing device according to any one of (1) to (6), further including:
a position sensor configured to detect a position of a terminal wearer; and
a communication unit configured to transmit detection information of the position sensor to the mobile device.

(8) The information processing device according to any one of (1) to (7), further including:
an activity amount measurement sensor configured to detect an activity amount of a terminal wearer; and
a communication unit configured to transmit detection information of the activity amount measurement sensor to the mobile device.

(9) The information processing device according to any one of (1) to (8), further including:
a sensor configured to detect a state of a terminal wearer;
a storage unit configured to store acquired information of the sensor as log data; and
a communication unit configured to transmit detection information of the sensor to the mobile device, in which
the log data indicating the state of the terminal wearer before the terminal wearer gets in the mobile device is output to the mobile device.

(10) The information processing device according to any one of (1) to (9), in which
the information processing device outputs section information indicating each section of the automatic driving section and the manual driving section on the traveling route of the mobile device, and a takeover section set between the automatic driving section and the manual driving section, and the display data by which a time to reach each section is confirmable.

(11) The information processing device according to any one of (1) to (10), in which
the information processing device has an alarm output function and configured to output an alarm at an output time of the recovery request notification to the manual driving.

(12) The information processing device according to any one of (1) to (11), in which
the information processing device has a vibration function and configured to perform vibration start processing at an output time of the recovery request notification to the manual driving.

(13) The information processing device according to any one of (1) to (12), in which
the information processing device is a wristwatch-type terminal.

(14) An information processing system including a mobile device and an information terminal having a wearable specification wearable on a driver of the mobile device, in which
the mobile device
executes processing of acquiring section information of an automatic driving section and a manual driving section on a traveling route of the mobile device, estimating a time to reach each section, and transmitting the estimated time to the information terminal, and
the information terminal
receives transmission data from the mobile device, and
outputs the section information of an automatic driving section and a manual driving section on a traveling route of the mobile device, and display data by which the time to reach each section is confirmable, to a display unit.

(15) The information processing system according to (14), in which
the mobile device acquires the section information of an automatic driving section and a manual driving section from a local dynamic map (LDM).

(16) The information processing system according to (14) or (15), in which
the mobile device estimates the time to reach each section on the basis of average speed information of a vehicle on the traveling route of the mobile device.

(17) The information processing system according to any one of (14) to (16), in which
the mobile device determines notification timing of a manual driving recovery request notification on the basis of at least either an arousal level or a position of a driver, and transmits determined notification timing information to the information terminal, and
the information terminal executes the manual driving recovery request notification at the notification timing.

(18) The information processing system according to (17), in which the information terminal executes processing of at least either outputting an alarm or starting vibration at the notification timing.

(19) An information processing method executed in an information processing device,
the information processing device being a wearable terminal wearable on a human body, the information processing method including:
by a data processing unit, outputting section information of an automatic driving section and a manual driving section on a traveling route of a mobile device, and display data by which a time to reach each section is confirmable, to a display unit.

(20) An information processing method executed in an information processing system including a mobile device and an information terminal having a wearable specification wearable on a driver of the mobile device, the information processing method including:
by the mobile device,
executing processing of acquiring section information of an automatic driving section and a manual driving section on a traveling route of the mobile device, estimating a time to reach each section, and transmitting the estimated time to the information terminal; and
by the information terminal,
receiving transmission data from the mobile device; and
outputting the section information of an automatic driving section and a manual driving section on a traveling route of the mobile device, and display data by which the time to reach each section is confirmable, to a display unit.

(21) A program for causing an information processing device to execute information processing,
the information processing device being a wearable terminal wearable on a human body,
the program for causing a data processing unit to output section information of an automatic driving section and a manual driving section on a traveling route of a mobile device, and display data by which a time to reach each section is confirmable, to a display unit.

Furthermore, the series of processing described in the description can be executed by hardware, software, or a combined configuration of the hardware and software. In the case of executing the processing by software, a program, in which the processing sequence is recorded, can be installed in a memory of a computer incorporated in dedicated hardware and executed by the computer, or the program can be installed in and executed by a general-purpose computer capable of executing various types of processing. For example, the program can be recorded in the recording medium in advance. Other than the installation from the recording medium to the computer, the program can be received via a network such as a local area network (LAN) or the Internet and installed in a recording medium such as a built-in hard disk.

Note that the various types of processing described in the description may be executed not only in chronological order as described but also in parallel or individually depending on the processing capability of the device that executes the process or as required. Furthermore, the system in the present description is a logical aggregate configuration of a plurality of devices, and is not limited to devices having respective configurations within the same housing.

INDUSTRIAL APPLICABILITY

As described above, according to a configuration of an embodiment of the present disclosure, a configuration to output section information of an automatic driving section and a manual driving section and display data by which a time to reach each section is confirmable to a wearable terminal is implemented.

Specifically, for example, a mobile device acquires the section information of the automatic driving section and the manual driving section on a traveling route, and estimates the time to reach each section and transmits the estimated time to an information terminal. The information terminal receives the transmission data from the mobile device, and outputs the section information of the automatic driving section and the manual driving section and the display data by which a time to reach each section is confirmable. Moreover, the mobile device determines notification timing of a manual driving recovery request notification on the basis of an arousal level, a position of a driver, or the like, and transmits the determined notification timing to the information terminal, and the information terminal executes the manual driving recovery request notification at the notification timing. In the case of a constantly wearable information terminal, driver's history logs before and after boarding, such as the driver's blood flow, can be acquired, and by installing a function to receive a health history such as sleeping time on the mobile device, the arousal level can be determined with higher accuracy.

With the present configuration, the configuration to output section information of an automatic driving section and a manual driving section and display data by which a time to reach each section is confirmable to a wearable terminal is implemented.

REFERENCE SIGNS LIST

10 Automobile
11 Data processing unit
12 Driver information acquisition unit
13 Environment information acquisition unit
14 Communication unit
15 Notification unit
20 Driver
30 Server
50 Information terminal
100 Mobile device
101 Input unit
102 Data acquisition unit
103 Communication unit
104 In-vehicle device
105 Output control unit
106 Output unit
107 Drive system control unit
108 Drive system
109 Body system control unit
110 Body system
111 Storage unit
112 Automatic driving control unit
121 Communication network
131 Detection unit
132 Self-position estimation unit
133 State analysis unit
134 Planning unit
135 Motion control unit
141 Vehicle exterior information detection unit
142 Vehicle interior information detection unit
143 Vehicle state detection unit
151 Map analysis unit
152 Traffic rule recognition unit
153 State recognition unit
154 State prediction unit
155 Safety determination unit (learning processing unit)
161 Route planning unit
162 Action planning unit
163 Motion planning unit
171 Emergency avoidance unit
172 Acceleration and deceleration control unit
173 Direction control unit
501 CPU
502 ROM
503 RAM
504 Bus
505 Input/output interface
506 Input unit
507 Output unit
508 Storage unit
509 Communication unit
510 Drive
511 Removable medium
521 Sensor
522 Drive unit

The invention claimed is:

1. An information processing device wearable on a human body, the information processing device comprising:
a display unit configured to:
output section information of an automatic driving section, a takeover section, and a manual driving section on a traveling route of a vehicle;
display first data by which a manual driving recoverable time to reach the manual driving section is confirmable,
wherein the manual driving recoverable time is based on learning data which is set for a driver of the vehicle and observation information which includes a type of a secondary task executed by the driver during automatic driving of the vehicle; and
display a driving recovery instruction based on a determination that a specific time to reach the manual driving section is greater than the manual driving recoverable time, wherein
the driving recovery instruction corresponds to a decrease in a speed of the vehicle to increase a time of the takeover section, and
the decrease in the speed corresponds to slow down of the vehicle without stopping.

2. The information processing device according to claim 1, wherein the display unit is further configured to display second data by which an output time of a recovery request notification to manual driving is confirmable.

3. The information processing device according to claim 1, wherein the display unit is further configured to display different pieces of the section information based on individual time axes in an inner peripheral portion and an outer peripheral portion.

4. The information processing device according to claim 1, wherein the display unit is further configured to display different pieces of the section information based on three or more individual time axes from an inner peripheral portion to an outer peripheral portion.

5. The information processing device according to claim 1, further comprising:
a sensor configured to detect a state of the driver who wears the information processing device; and
a transceiver configured to transmit detection information of the sensor to the vehicle.

6. The information processing device according to claim 1, further comprising:
a biosensor configured to detect a motion of the driver who wears the information processing device; and
a transceiver configured to transmit detection information of the biosensor to the vehicle.

7. The information processing device according to claim 1, further comprising:
a position sensor configured to detect a position of the driver who wears the information processing device; and a transceiver configured to transmit detection information of the position sensor to the vehicle.

8. The information processing device according to claim 1, further comprising:
an activity amount measurement sensor configured to detect an activity amount of the driver who wears the information processing device; and
a transceiver configured to transmit detection information of the activity amount measurement sensor to the vehicle.

9. The information processing device according to claim 1, further comprising:
a sensor configured to detect a state of the driver who wears the information processing device;
a memory configured to store acquired information of the sensor as log data; and
a transceiver configured to transmit detection information of the sensor to the vehicle, wherein
the log data indicates the state of the driver before the driver gets in the vehicle, and
the log data is output to the vehicle.

10. The information processing device according to claim 1, further comprising a central processing unit configured to output
the section information which indicates each section of the automatic driving section, the takeover section, and the manual driving section on the traveling route of the vehicle, wherein the takeover section is set between the automatic driving section and the manual driving section, and
the first data.

11. The information processing device according to claim 1, further comprising a central processing unit configured to control output of an alarm at an output time of a recovery request notification for manual driving.

12. The information processing device according to claim 1, further comprising a central processing unit configured to control vibration start processing at an output time of a recovery request notification for manual driving.

13. The information processing device according to claim 1, wherein the information processing device is a wristwatch-type terminal.

14. An information processing system, comprising:
a first vehicle; and
an information terminal wearable on a driver of the first vehicle, wherein
the first vehicle comprises a first central processing unit (CPU) configured to:
acquire section information of an automatic driving section, a takeover section, and a manual driving section on a traveling route of the first vehicle;
estimate a manual driving recoverable time to reach the manual driving section, based on learning data which is set for the driver and observation information which includes a type of a secondary task executed by the driver during automatic driving of the first vehicle;
acquire a driving recovery instruction based on a determination that a specific time to reach the manual driving section is greater than the estimated manual driving recoverable time, wherein the driving recovery instruction corresponds to a decrease in a speed of the first vehicle to increase a time of the takeover section, and the decrease in the speed corresponds to slow down of the first vehicle without stopping; and
transmit first data which includes the acquired driving recovery instruction to the information terminal, and
the information terminal comprises:
a second CPU configured to:
receive the first data from the first vehicle; and
output the section information of the automatic driving section, the takeover section, and the manual driving section on the traveling route of the first vehicle; and
a display unit configured to display second data by which the increased time of the takeover section is confirmable.

15. The information processing system according to claim 14, wherein the first CPU is further configured to acquire the section information from a local dynamic map (LDM).

16. The information processing system according to claim 14, wherein the first CPU is further configured to estimate the manual driving recoverable time based on average speed information of a second vehicle on the traveling route of the first vehicle.

17. The information processing system according to claim 14, wherein
the first CPU is further configured to:
determine notification timing of a manual driving recovery request notification based on at least one of an arousal level or a position of the driver; and
transmit notification timing information to the information terminal, wherein the notification timing information indicates the determined notification timing, and
the second CPU is further configured to execute the manual driving recovery request notification at the notification timing.

18. The information processing system according to claim 17, wherein the second CPU is further configured to at least one of output an alarm or start vibration at the notification timing.

19. An information processing method, comprising:
outputting section information of an automatic driving section, a takeover section, and a manual driving section on a traveling route of a vehicle;
displaying data by which a manual driving recoverable time to reach the manual driving section is confirmable, wherein
the manual driving recoverable time is based on learning data which is set for a driver of the vehicle and observation information which includes a type of a secondary task executed by the driver during automatic driving of the vehicle; and
displaying a driving recovery instruction based on a determination that a specific time to reach the manual driving section is greater than the manual driving recoverable time, wherein
the driving recovery instruction corresponds to a decrease in a speed of the vehicle to increase time of the takeover section, and
the decrease in the speed corresponds to slow down of the vehicle without stopping.

20. An information processing method executed in an information processing system including a vehicle and an information terminal wearable on a driver of the vehicle, the information processing method comprising:
acquiring, by the vehicle, section information of an automatic driving section, a takeover section, and a manual driving section on a traveling route of the vehicle;

estimating, by the vehicle, a manual driving recoverable time to reach the manual driving section, based on learning data which is set for the driver and observation information which includes a type of a secondary task executed by the driver during automatic driving of the vehicle;

acquiring, by the vehicle, a driving recovery instruction based on a determination that a specific time to reach the manual driving section is greater than the estimated manual driving recoverable time, wherein
- the driving recovery instruction corresponds to a decrease in a speed of the vehicle to increase time of the takeover section, and
- the decrease in the speed corresponds to slow down of the vehicle without stopping;

transmitting, by the vehicle, first data which includes the acquired driving recovery instruction to the information terminal;

receiving, by the information terminal, the first data from the vehicle;

outputting, by the information terminal, the section information of the automatic driving section, the takeover section, and the manual driving section on the traveling route of the vehicle; and displaying, by the information terminal, second data by which the increased time of the takeover section is confirmable.

21. A non-transitory computer-readable medium having stored thereon, computer-executable instructions which, when executed by a computer, cause the computer to execute operations, the operations comprising:

outputting section information of an automatic driving section, a takeover section, and a manual driving section on a traveling route of a vehicle;

displaying data by which a manual driving recoverable time to reach the manual driving section is confirmable, wherein
- the manual driving recoverable time is based on learning data which is set for a driver of the vehicle and observation information which includes a type of a secondary task executed by the driver during automatic driving of the vehicle; and displaying a driving recovery instruction based on a determination that a specific time to reach the manual driving section is greater than the manual driving recoverable time, wherein
- the driving recovery instruction corresponds to a decrease in a speed of the vehicle to increase time of the takeover section, and
- the decrease in the speed corresponds to slow down of the vehicle without stopping.

* * * * *